(12) United States Patent  
Kato et al.

(10) Patent No.: US 8,023,383 B2  
(45) Date of Patent: Sep. 20, 2011

(54) RECORDING DEVICE, RECORDING METHOD, AND COMPUTER PROGRAM

(75) Inventors: Masahiro Kato, Saitama (JP); Masahiro Miura, Saitama (JP); Eisaku Kawano, Saitama (JP); Tohru Kanegae, Saitama (JP)

(73) Assignee: Pioneer Corporation, Tokyo (JP)

( * ) Notice: Subject to any disclaimer, the term of this patent is extended or adjusted under 35 U.S.C. 154(b) by 992 days.

(21) Appl. No.: 11/597,715

(22) PCT Filed: Dec. 26, 2005

(86) PCT No.: PCT/JP2005/023753  
§ 371 (c)(1),  
(2), (4) Date: Jan. 29, 2007

(87) PCT Pub. No.: WO2006/073078  
PCT Pub. Date: Jul. 13, 2006

(65) Prior Publication Data  
US 2008/0068943 A1 Mar. 20, 2008

(30) Foreign Application Priority Data  
Jan. 6, 2005 (JP) .................... 2005-001819

(51) Int. Cl.  
*G11B 7/00* (2006.01)
(52) U.S. Cl. .... 369/94; 369/30.2; 369/47.53; 369/44.39
(58) Field of Classification Search .............. 369/30.2, 369/30.21, 30.22, 44.39, 47.53, 94  
See application file for complete search history.

(56) References Cited

U.S. PATENT DOCUMENTS

2004/0264715 A1* 12/2004 Lu et al. ............... 381/119  
2008/0019239 A1* 1/2008 Miura et al. ............ 369/44.39

FOREIGN PATENT DOCUMENTS

| EP | 1 318 509 | 6/2003 |
| JP | 2000-311346 | 11/2000 |
| JP | 2001-023237 | 1/2001 |
| WO | 00/23990 | 4/2000 |
| WO | 00/62286 | 10/2000 |
| WO | 02/075728 | 9/2002 |
| WO | 2004/112007 | 12/2004 |
| WO | 2004/114289 | 12/2004 |

OTHER PUBLICATIONS

European Patent Office issued an Euorpean Search Report dated Feb. 2, 2009, Application No. 05819880.5.

* cited by examiner

*Primary Examiner* — Will J Klimowicz  
*Assistant Examiner* — Andrew Sasinowski  
(74) *Attorney, Agent, or Firm* — Young & Thompson

(57) ABSTRACT

A recording apparatus with a device for recording information onto a medium, provided with: (i) a first layer irradiated with laser light to record information on a first area; and (ii) a second layer irradiated with laser light through the first layer and having a second area whose edge on an inner circumferential side corresponds to an edge on an outer circumferential side of the first area; and a controlling device for controlling the recording device to pre-record, into an area portion of the first area, other than an area portion having a size corresponding to a tolerance length, which indicates an acceptable range of a relative position shift between an address defined on the predetermined position in the first layer and an address related to the predetermined position in the second layer, with the edge on the outer circumferential side of the first area as a starting point.

11 Claims, 11 Drawing Sheets

[FIG. 1]
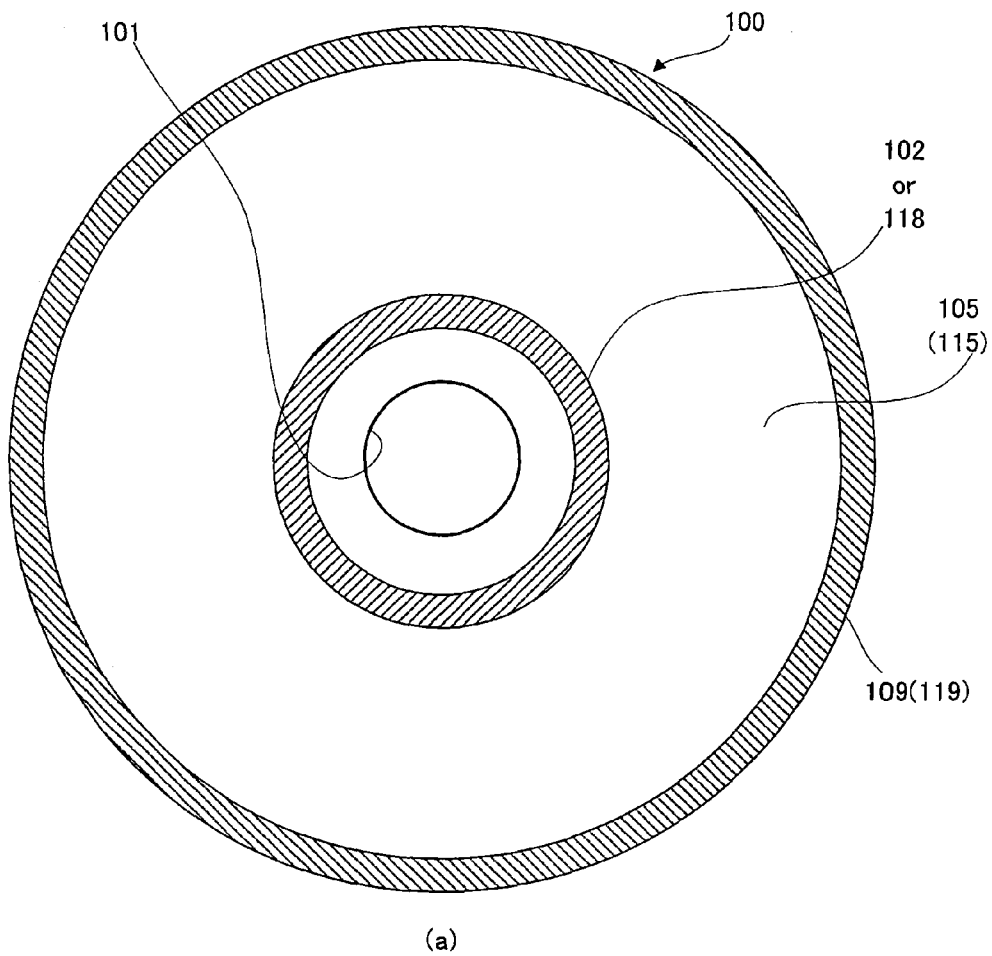
(a)
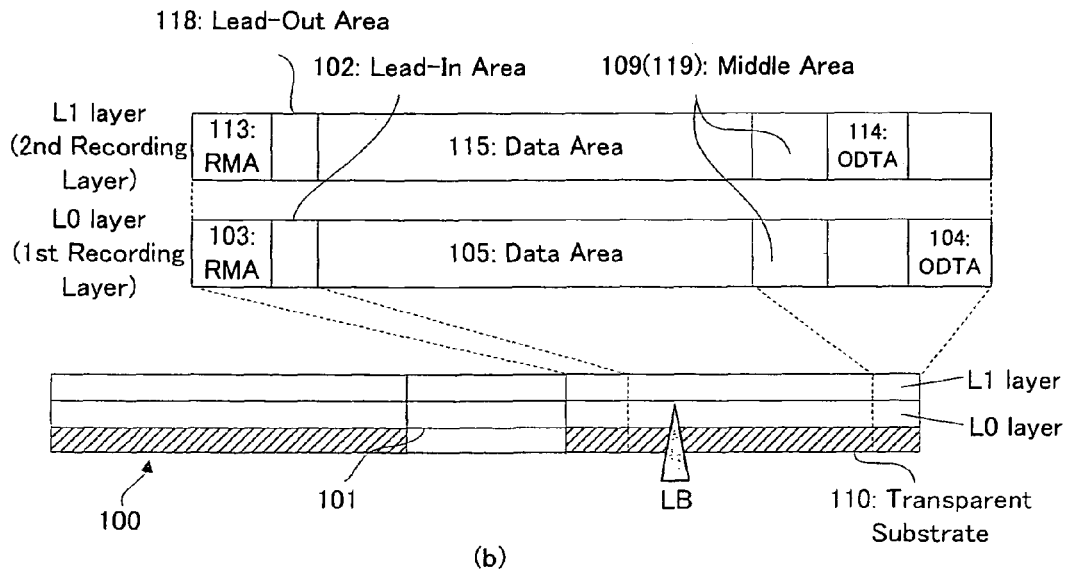
(b)

[FIG. 2]
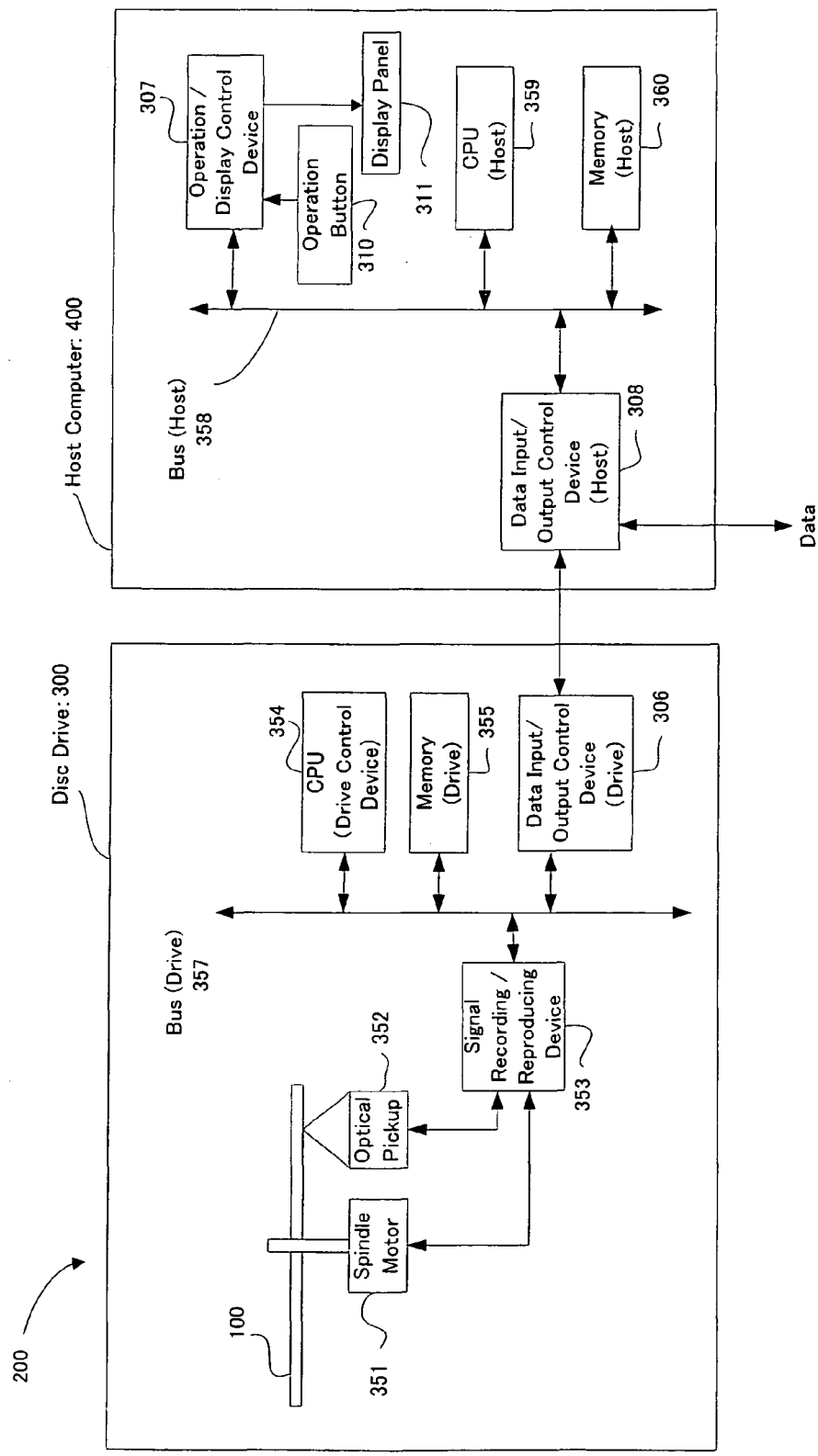

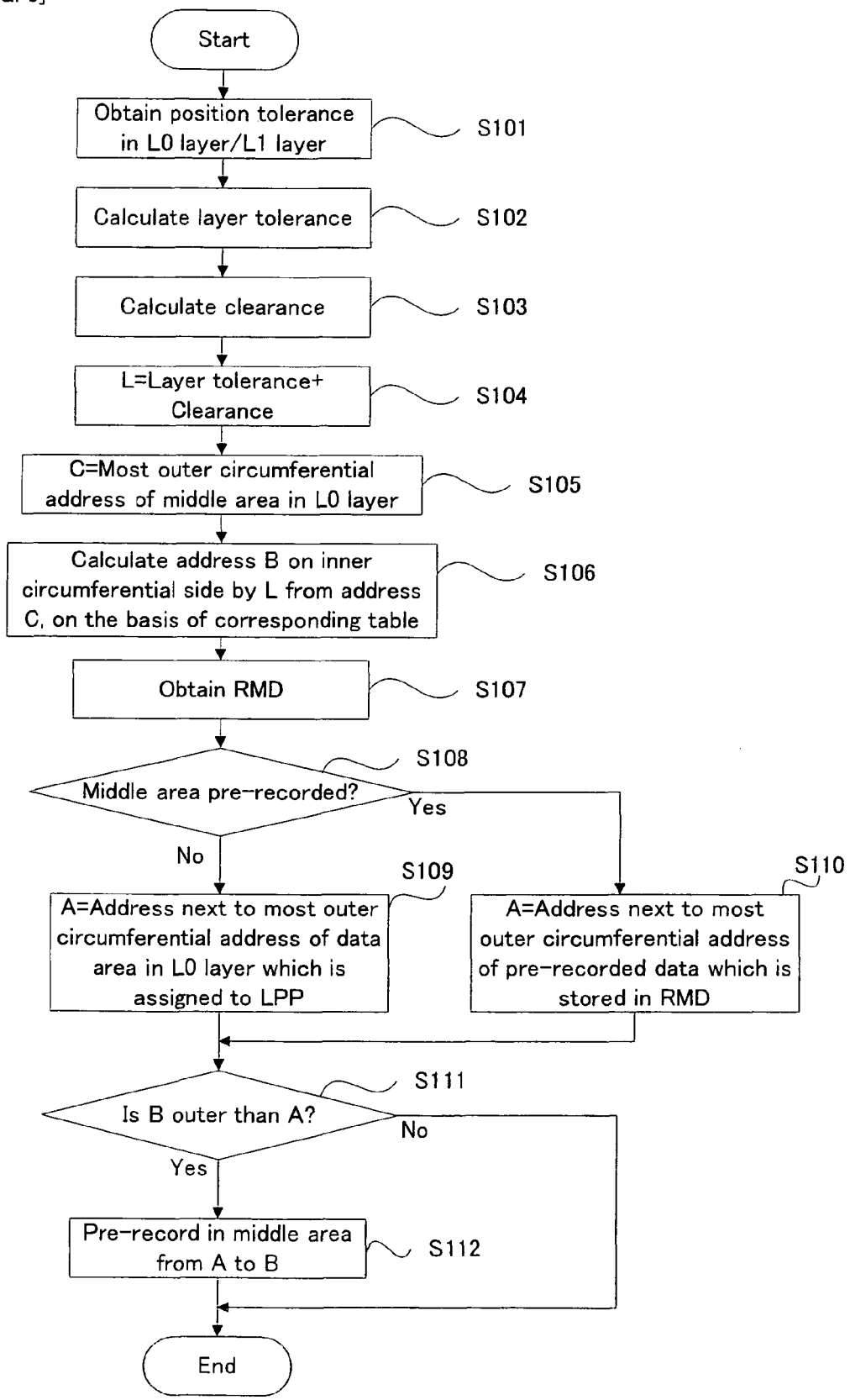

[FIG. 4]
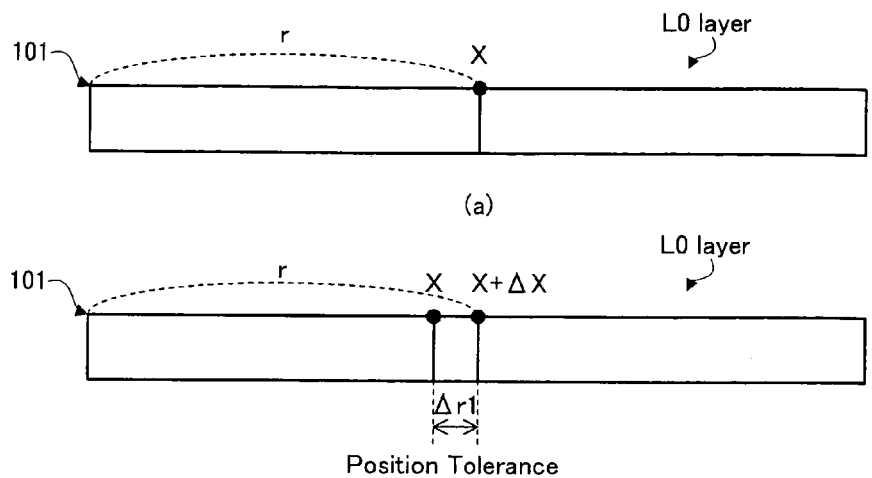
[FIG. 5]
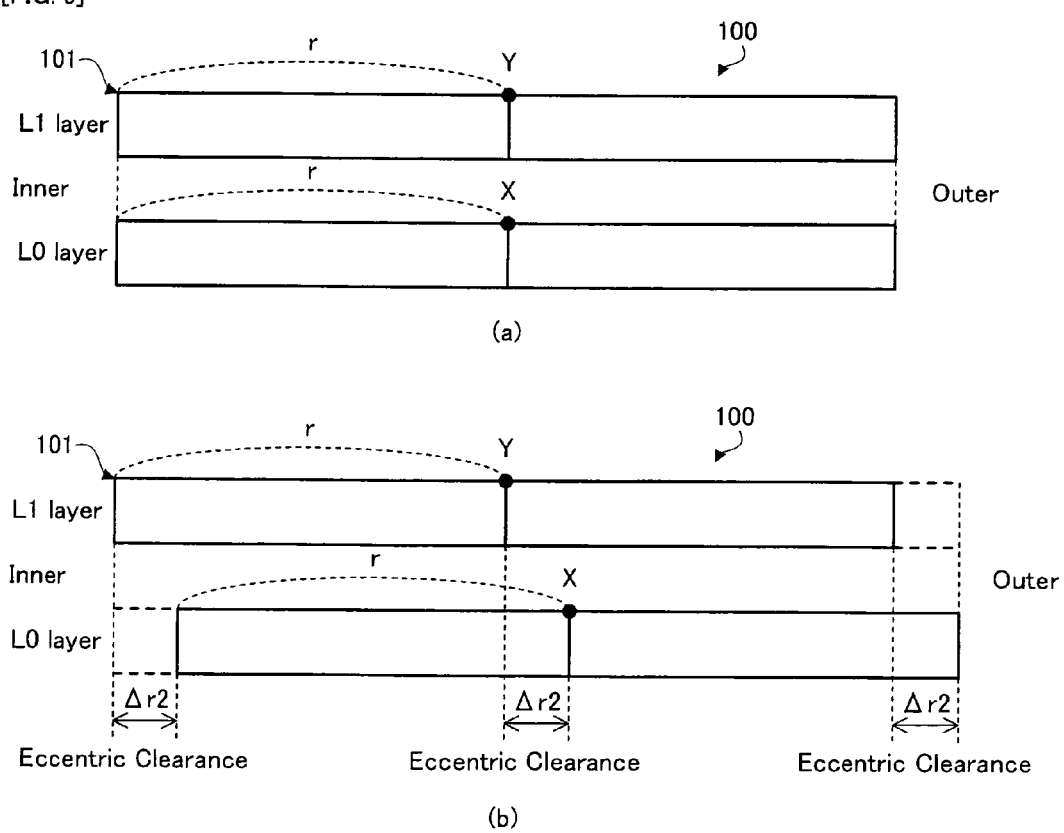

[FIG. 6]
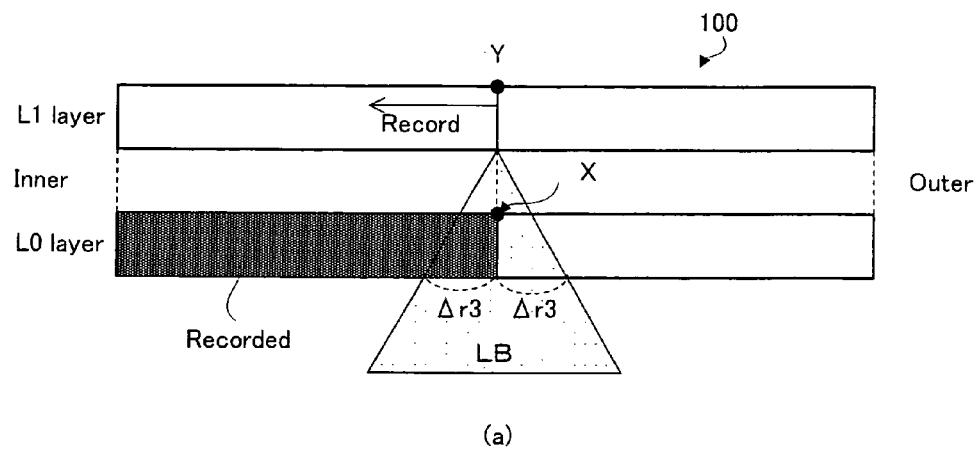
(a)
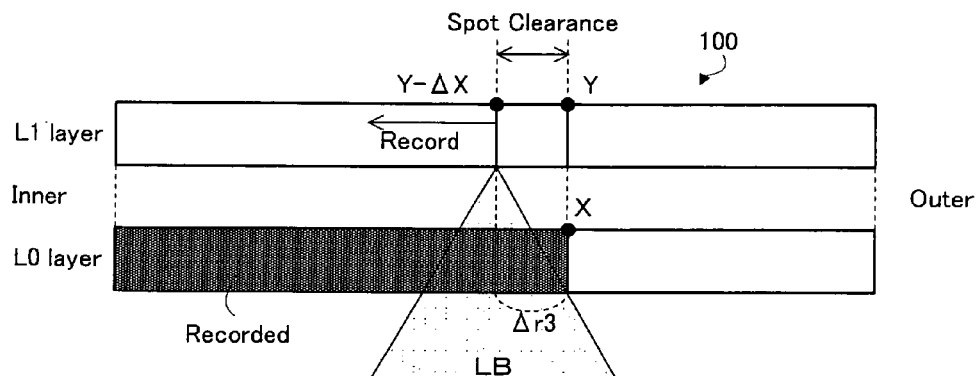
(b)

[FIG. 7]
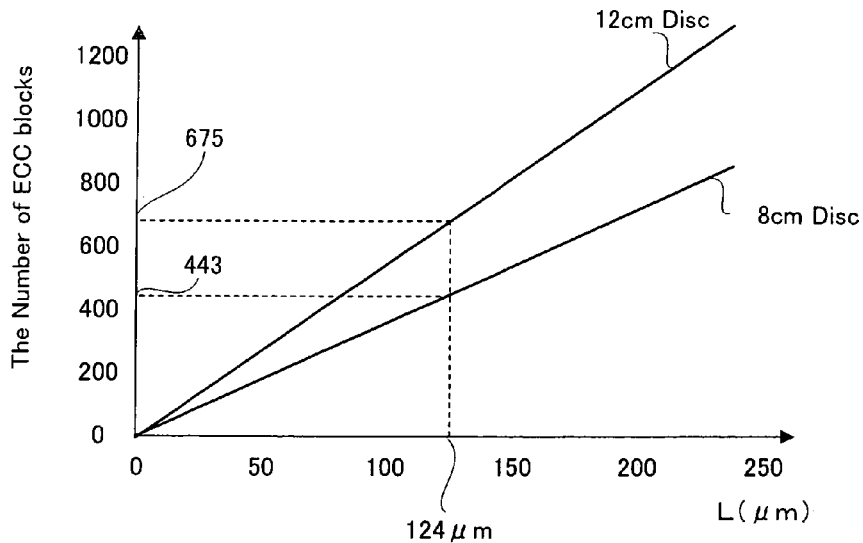
[FIG. 8]
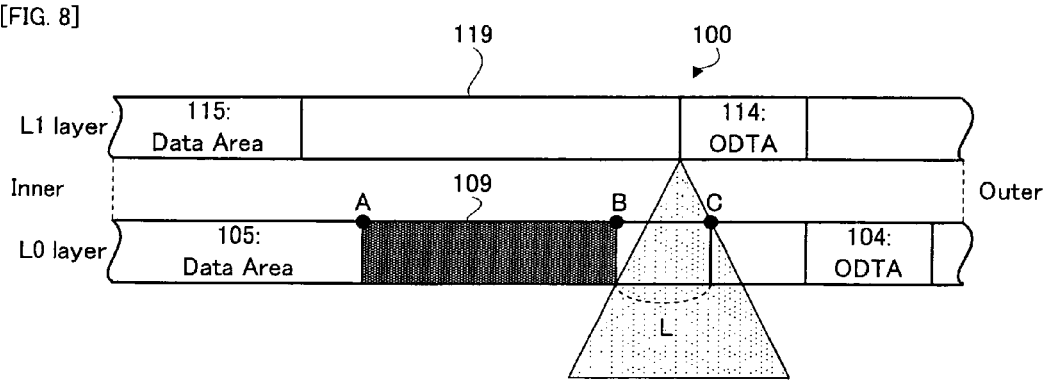
[FIG. 9]
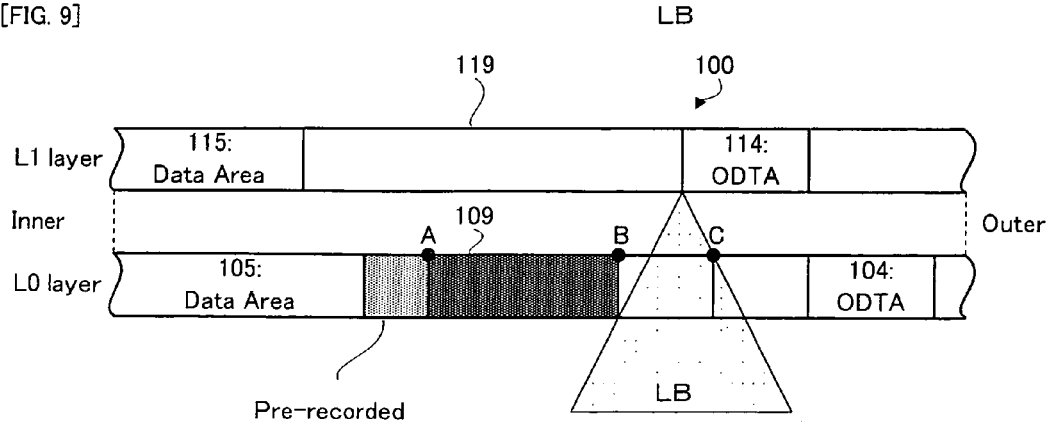

[FIG. 10]
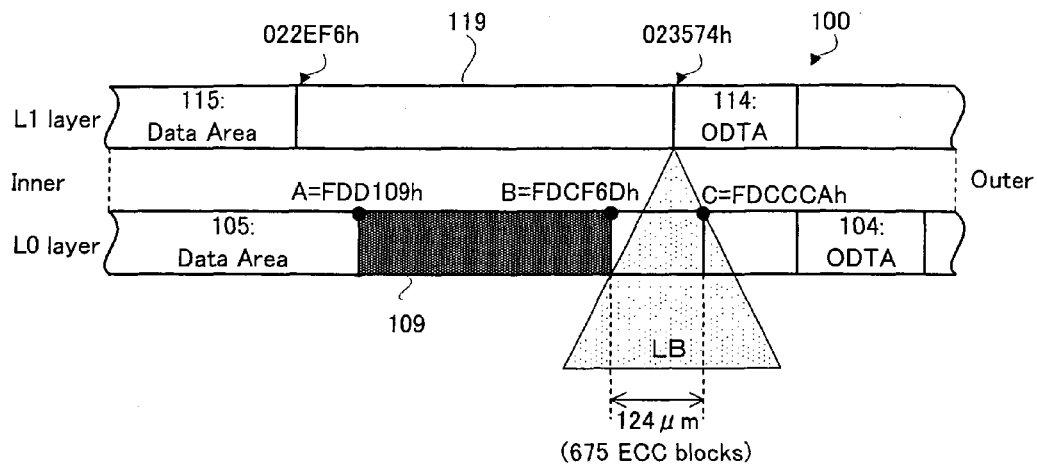
[FIG. 11]
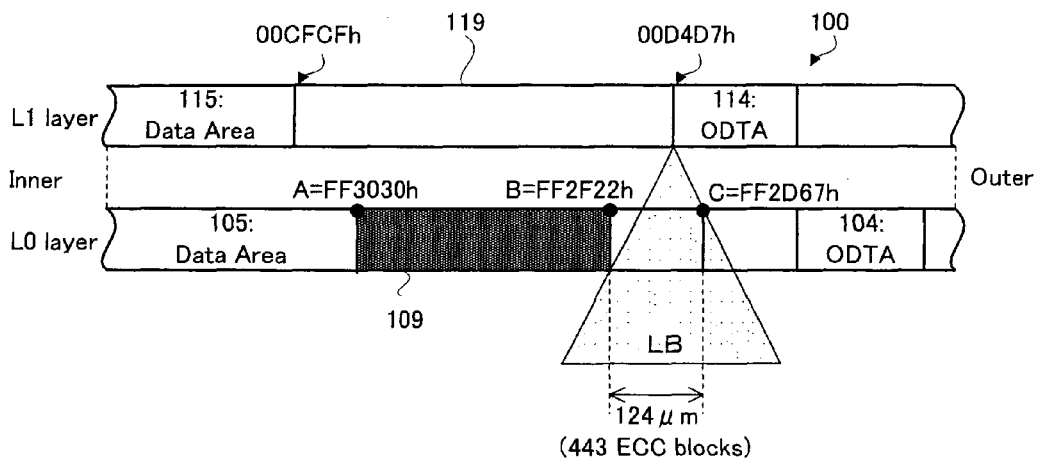

[FIG. 12]
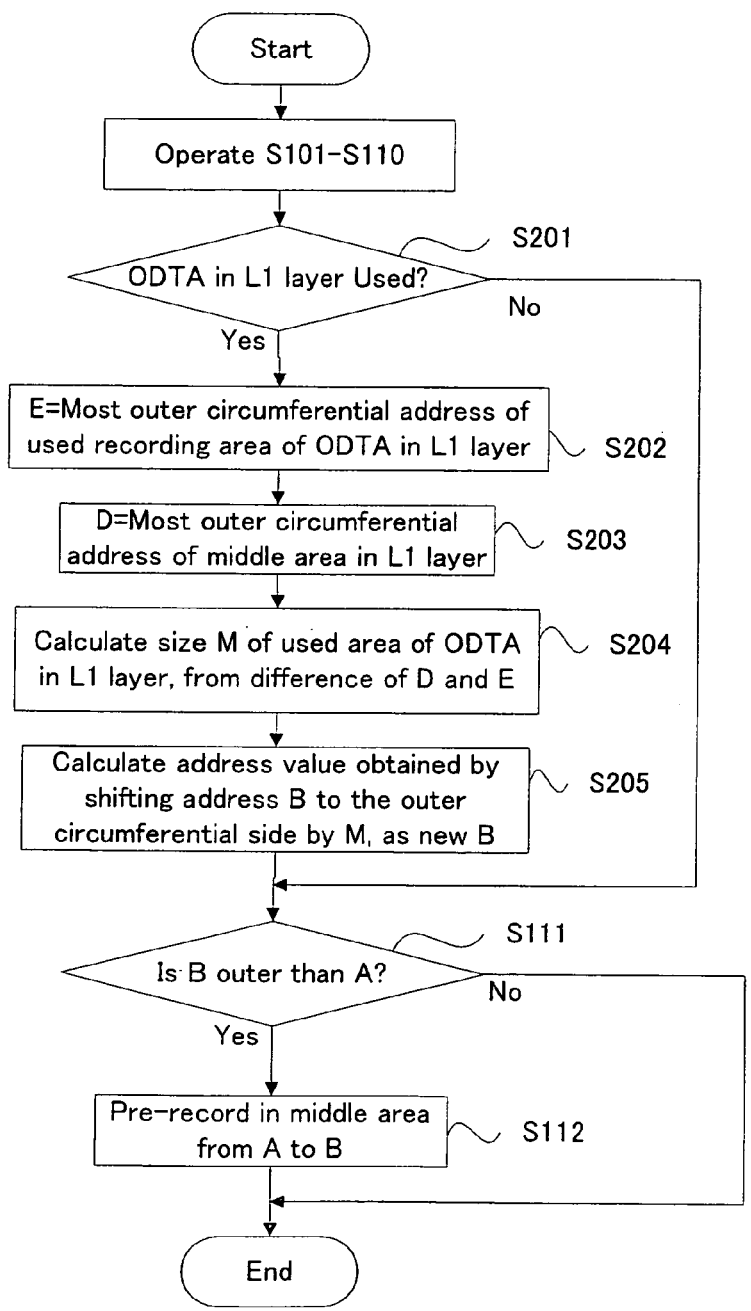

[FIG. 13]
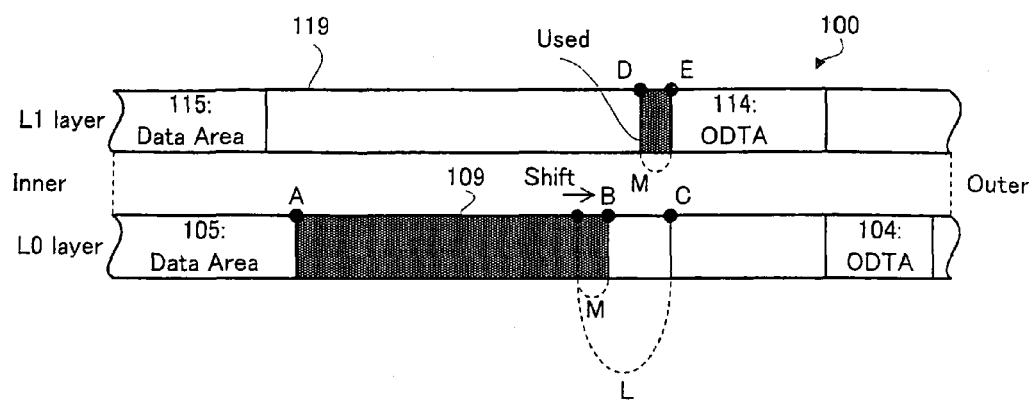
[FIG. 14]
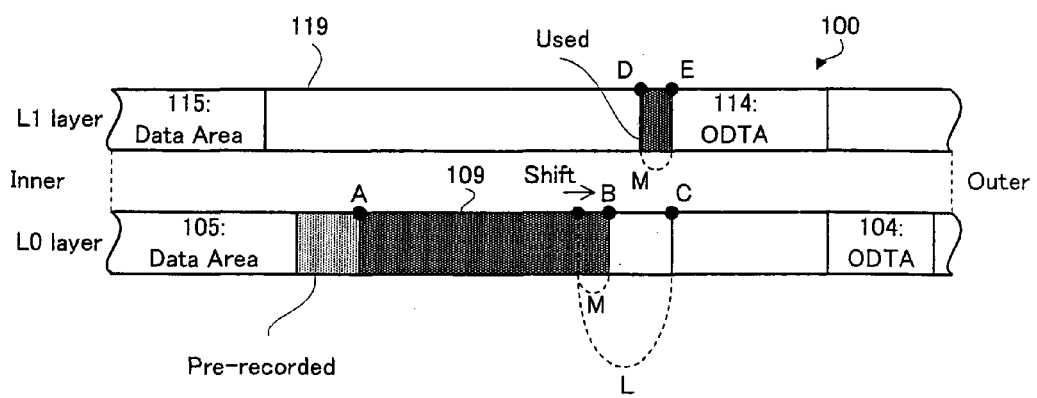

[FIG. 15]
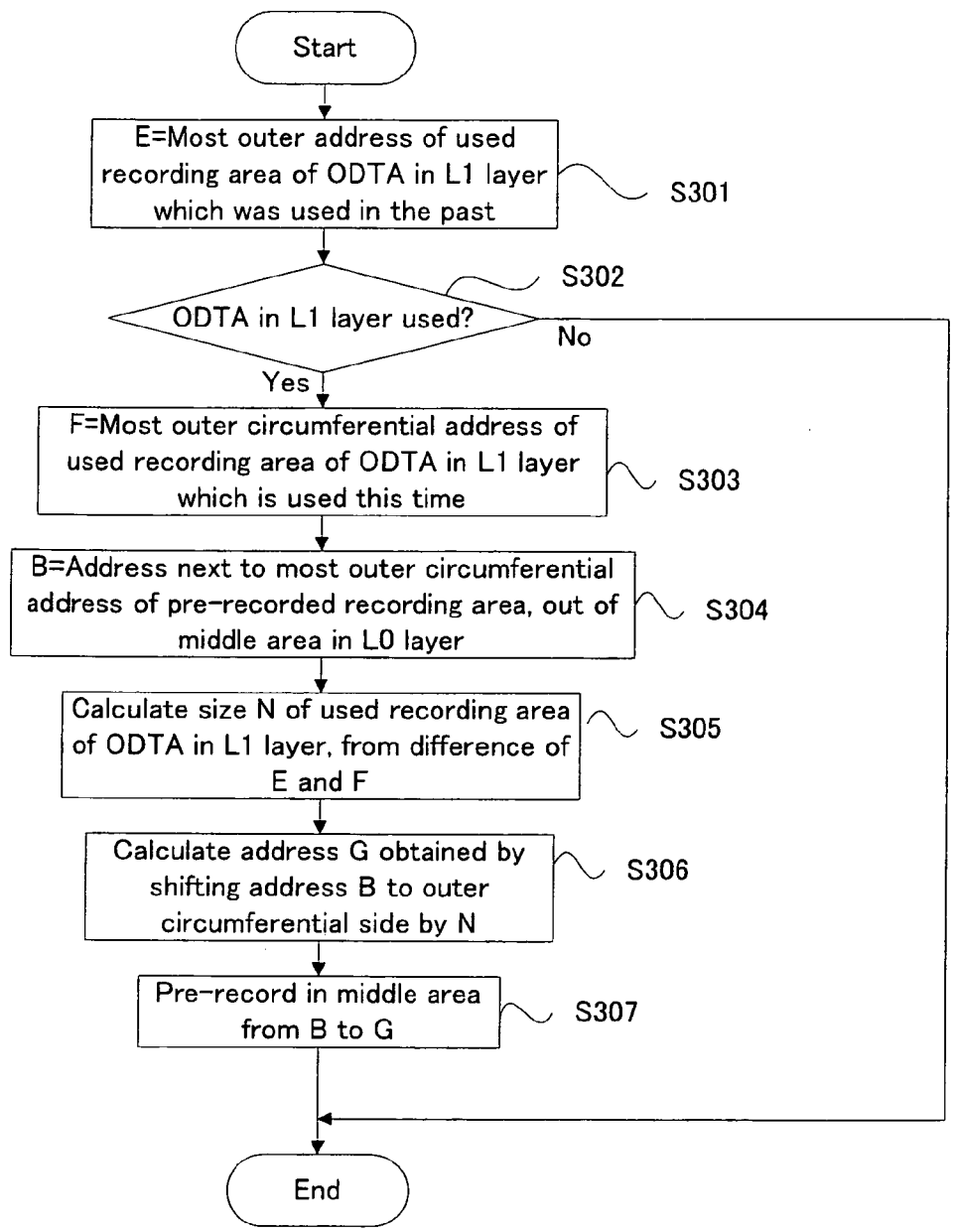

[FIG. 16]
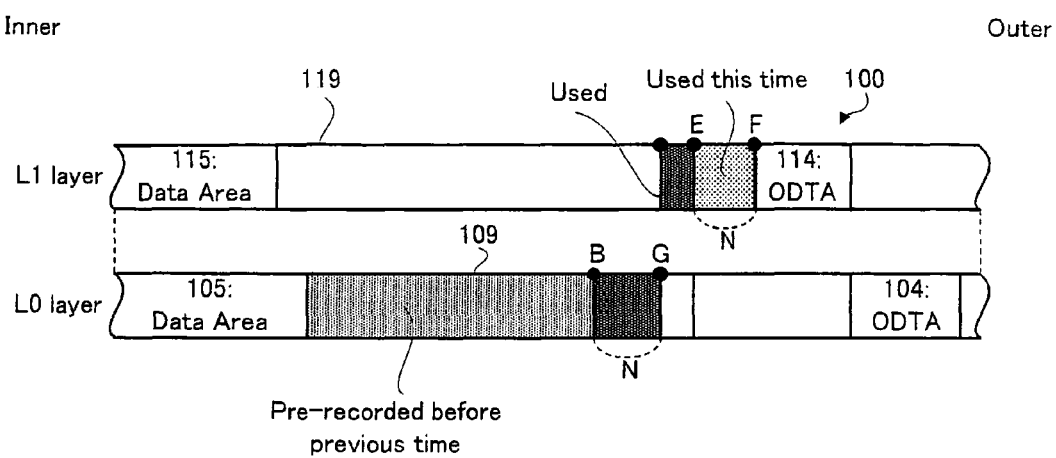

RECORDING DEVICE, RECORDING METHOD, AND COMPUTER PROGRAM

TECHNICAL FIELD

The present invention relates to a recording apparatus and method, such as a DVD recorder, and a computer-readable recording medium recording thereon a computer program which makes a computer function as the recording apparatus.

BACKGROUND ART

In an information recording medium, such as a CD-ROM (Compact Disc-Read Only Memory), a CD-R (Compact Disc-Recordable) and a DVD-ROM, for example, as described in patent documents 1 and 2, etc., there is also developed an information recording medium, such as a multi-layer type optical disc, in which a plurality of recording layers are laminated or pasted on the same substrate. Then, on an information recording apparatus, such as a DVD recorder, for performing the recording with respect to the dual-layer type (i.e., two-layer type) optical disc, laser light for recording is focused on a recording layer located on the front (i.e. on the closer side to an optical pickup) as viewed from the irradiation side of the laser light (hereinafter referred to as an "L0 layer", as occasion demands) to thereby record data into the L0 layer in an irreversible change recording method or a rewritable method by heat. Moreover, the laser light is focused or condensed on a recording layer located on the rear of the L0 layer (i.e. on the farther side from the optical pickup) as viewed from the irradiation side of the laser light (hereinafter referred to as an "L1 layer", as occasion demands), through the L0 layer or the like, to thereby record information into the L1 layer in the irreversible change recording method or the rewritable method by heat.

patent document 1: Japanese Patent Application Laid Open No. 2000-311346 patent document 2: Japanese Patent Application Laid Open No. 2001-23237

DISCLOSURE OF INVENTION

Subject to be Solved by the Invention

In such a dual-layer type optical disc, if the data is recorded into the L1 layer, it is necessary to irradiate the laser light through the L0 layer. In this case, the record data may be recorded in the L0 layer through which the laser light is irradiated with the L1 layer, or may not be recorded. As described above, the recording state of the L0 layer is not necessarily same, which causes a change in the state of the laser light with which the L1 layer is irradiated. Thus, a method in which the L0 layer is made in a recorded state to thereby properly record the record data into the L1 layer is also invented by the inventors of the present invention or the like.

However, a position where an address of the L0 layer or the L1 layer is defined in design does not necessarily match a position where an address of the optical disc actually manufactured or produced is defined, depending on the quality of a production process. In other words, there is a possibility that an optical disc is produced in which a certain address is actually located away from a radial position where the certain address is to be located in design. Thus, a predetermined area is not disposed in an intended position in design, which results in a technical problem that the laser light is not necessarily irradiated onto the L1 layer through a recording area in the recorded state in the L0 layer.

On the other hand, in the dual-layer type optical disc in an opposite track path method, for example, a middle area is located on the most outer circumferential side of the optical disc. The middle area is to buffer a changing operation in changing the focus of the laser light from the L0 layer to the L1 layer, and dummy data or the like is recorded into the middle area upon finalizing. At this time, in order to reduce a time length required for the finalizing, a technology of recording in advance (hereinafter referred to "pre-recording") pre-determined dummy data in the middle area in the recording operation has been invented by the inventors of the present invention. In the case of a dual-layer type DVD-R, which is one standard of the optical disc and in which the development of the standard has been advanced, for example, an ODTA (Outer Disc Testing Area) for calibrating the power of the laser light is provided on the outer circumferential side of the middle area in each of the L0 layer and the L1 layer. Since the ODTA is used to calibrate the power of the laser light, it is necessary to strictly define the recording state of the recording area in the L0 layer, in using the ODTA of the L1 layer. Specifically, it is defined such that the data is not recorded into the recording area of the L0 layer which faces or is opposed to the ODTA of the L1 layer which is not used yet. In accordance with this, the pre-recording of the middle area in the vicinity of the ODTA needs to be selectively performed only in a proper recording area. However, due to a shift in the position where the certain address is defined upon production or the like, as described above, the proper recording area cannot be preferably specified. As a result, there is a technical problem that it is impossible to reduce a time length required for the finalizing because of insufficient pre-recording.

It is therefore an object of the present invention to provide a recording apparatus and method which enable preferable pre-recording to reduce a time length required for the finalizing even on an information recording medium having a plurality of recording layers, for example, as well as a computer-readable recording medium recording thereon a computer program.

Means for Solving the Subject (Recording Apparatus)

The above object of the present invention can be achieved by a first recording apparatus provided with: a recording device for recording record information by irradiating laser light onto a recording medium provided with: (i) a first recording layer which is irradiated with the laser light to thereby record therein the record information and which has a first area in which the record information is recorded; and (ii) a second recording layer which is irradiated with the laser light through the first recording layer to thereby record therein the record information and which has a second area whose s edge on an inner circumferential side corresponds to an edge on an outer circumferential side of the first area; and a controlling device for controlling the recording device to record pre-information in advance as the record information, into an area portion as being one portion of the first area, at least other than an area portion having a size corresponding to a tolerance length, which indicates an acceptable range of a relative position shift between an address which is defined on the predetermined position in the first recording layer and an address which is related to the predetermined position in the second recording layer, with the edge on the outer circumferential side of the first area as a starting point.

According to the first recording apparatus of the present invention, by the operation of the recording device, it is possible to preferably record the record information including video information, audio information or the like, onto the recording medium provided with both the first and second recording layers. For example, by irradiating the laser light so as to focus on the first recording layer, the record information is recorded into the first recording layer, while by irradiating the laser light so as to focus on the second recording layer, the record information is recorded into the second recording layer. In the first embodiment, the first recording layer is provided with the first area in which the record information is recorded upon the finalizing (e.g. a middle area, etc., described later, used to buffer a changing operation in changing the focus of the laser light from an L0 layer to an L1 layer or from the L1 layer to the L0 layer), in addition to a data area in which the record information, such as the video information and the audio information, is recorded. Moreover, the second recording layer is provided with the second area (e.g. an ODTA described later, used to calibrate the power of the laser light). The edge on the inner circumferential side of the second area corresponds to the edge on the outer circumferential side of the first area. The term "correspond to" herein indicates that it exists at a substantially facing or opposed position in design (e.g. at substantially the same radial position). In an actual recording medium, it is necessarily located at the facing position due to an influence, accuracy or the like in the production process.

Particularly, in the first recording apparatus, by the operation of the controlling device, the pre-information is pre-recorded into an area portion as being one portion of the first area, before the finalizing. At this time, the pre-information is pre-recorded into the area portion as being one portion of the first area, at least other than an area portion having a size corresponding to the tolerance length, from a position represented by the address of the edge on the outer circumferential side of the first area (i.e. the end edge of the first area, which substantially match the edge on the inner circumferential side of the second area, in design). Specifically, in the case of the recording medium in the opposite track path method, the pre-information is pre-recorded into the area portion as being one portion of the first area, other than an area portion from the position represented by the address of the edge on the outer circumferential side of the first area to a position obtained by shifting to the inner circumferential side by the tolerance length. The "tolerance length" indicates the acceptable range of the relative position shift between an address which is defined on the predetermined position in the first recording layer and an address which is related to the predetermined position in the second recording layer. In other words, the "tolerance length" indicates the acceptable range of a relative position shift between an address which is defined on the predetermined position in the first recording layer and an address which is defined on the predetermined position in said second recording layer. In other words, the "tolerance length" is the sum of: (i) the acceptable range of a position shift in the first recording layer between a position where a predetermined address is defined in design and a position of the predetermined address on the actually produced recording medium; and (ii) the acceptable range of a position shift in the second recording layer between a position where a predetermined address is defined in design and a position of the predetermined address on the actually produced recording medium. Moreover, the "pre-information" herein indicates information in general which is recorded in advance into the first area before the finalize process, and the content of the information is not limited. In other words, dummy data, descried later, is also one example of the pre-information. On the other hand, information which as some meaning (control information, etc.) also constitutes one example of the "pre-information" as long as recorded before the finalize process.

As described above, according to the first recording apparatus, the pre-information is pre-recorded into the first area, in view of the position shift of the address caused in the production process of the recording medium or the like. Therefore, in recording the record information into the second area, it is possible to record the record information into the second area through the first recording layer in which the record information is unrecorded, without influence of the pre-information which is pre-recorded in the first area. Moreover, it is also possible to pre-record the pre-information into the first area, without influence on the recording operation of recording the record information into the second area. Thus, upon the finalizing, it is possible to reduce the size of the record information to be recorded into the first area, so that it is possible to reduce a time length required for the finalizing.

Consequently, according to the first recording apparatus, it is possible to preferably perform the pre-recording in order to reduce a time length required for the finalizing, even on the information recording medium having a plurality of recording layers.

In one aspect of the first recording apparatus of the present invention, the record information is recorded into the second area through the first recording layer in which the record information is unrecorded.

According to this aspect, as described later, for example, it is possible to preferably calibrate the power of the laser light by using the second area. At the same time, it is possible to preferably perform the pre-recording of the first area, as described above, and reduce a time length required for the finalizing.

In another aspect of the first recording apparatus of the present invention, the controlling device controls the recording device to record the pre-information in advance, into an area portion as being one portion of the first area, other than an area portion having a size corresponding to a clearance length which indicates a sum of (i) a spot radius of the laser light on the first recording layer in the case that the laser light is focused on the second recording layer and (ii) a relative eccentric shift of the first and second recording layers or an acceptable range of the eccentric shift, in addition to the area portion corresponding to the tolerance length.

According to this aspect, it is possible to pre-record the pre-information into an area portion as being one portion of the first area, in view of the eccentric shift and the size of the spot of the laser light or the like, in addition to the position shift in the address caused in the production process of the recording medium or the like. Therefore, it is possible to record the record information into the second area through the first recording layer in which the record information is unrecorded, without influence of the pre-information which is pre-recorded in the first area. At the same time, it is possible to reduce a time length required for the finalizing.

In another aspect of the first recording apparatus of the present invention, the recording apparatus is further provided with a converting device for converting the tolerance length to a recording unit of the record information, and the controlling device controls the recording device to record the pre-information in advance, into an area portion as being one portion of the first area, at least other than an area portion having a size corresponding to the tolerance length which is converted to the recording unit.

According to this aspect, it is possible to recognize the tolerance length by the recording unit (e.g. ECC block unit) of the record information which is easily recognized or easily handled by the recording apparatus. Therefore, the recording apparatus can recognize the area portion as being one portion of the first area, preferably and relatively easily.

In an aspect of the recording apparatus provided with the converting device, as described above, the converting device may convert the tolerance length to the recording unit of the record information, on the basis of correspondence information which defines a correspondence relationship between the tolerance length and a size of the record information which can be recorded into an area portion having a size corresponding to a predetermined tolerance length.

By such construction, it is possible to convert the tolerance length to the recording unit of the record information, relatively easily, by referring to the correspondence information.

In an aspect of the recording apparatus in which the tolerance length is converted to the recording unit on the basis of the correspondence information, as described above, the converting device may convert the tolerance length to the recording unit of the record information, on the basis of at least one of a plurality of correspondence information, in accordance with at least one of a type of the recording medium and a position of the first area on the first recording layer.

By such construction, it is possible to convert the tolerance length to the recording unit of the record information, relatively easily, without influence of a difference in the type of the recording medium and a difference in the arrangement of the first area, yet depending on each difference.

In an aspect of the recording apparatus in which the tolerance length is converted to the recording unit on the basis of the correspondence information, as described above, the recording apparatus may be further provided with a storing device for storing the correspondence information.

By such construction, it is possible to convert the tolerance length to the recording unit of the record information, relatively easily, by referring to the correspondence information stored in the storing device.

In an aspect of the recording apparatus in which the tolerance length is converted to the recording unit on the basis of the correspondence information, as described above, the converting device may convert the tolerance length to the recording unit of the record information, on the basis of the correspondence information recorded on the recording medium.

By such construction, even in the recording apparatus which does not have the correspondence information, it is possible to convert the tolerance length to the recording unit of the record information, relatively easily, by referring to the correspondence information recorded on the recording medium.

In another aspect of the first recording apparatus of the present invention, if the record information is recorded in the second area, the controlling device controls the recording device to record the pre-information in advance, into an area portion as being one portion of the first area, at least other than an area portion having a size corresponding to the tolerance length, with a position of the first recording layer corresponding to an edge on the inner circumferential side of an area portion in the second area in which the record information is unrecorded as a starting point.

According to this aspect, if the record information is already recorded in the second area, the area portion of the first area in which the pre-information can be pre-recorded increases. Therefore, it is possible to further reduce a time length required for the finalizing.

In another aspect of the first recording apparatus of the present invention, if the record information is newly recorded into the second area, the controlling device controls the recording device to record the pre-information in advance, into an area portion as being one portion of the first area having a size of an area portion in the second area in which the record information is newly recorded, following the area portion in which the pre-recorded information is recorded in advance.

According to this aspect, if the record information is newly recorded into the second area, it is possible to pre-record the pre-information into an area portion of the first area having a size of the newly recorded area portion (or the newly recorded record information). Therefore, it is possible to further reduce a time length required for the finalizing.

In another aspect of the first recording apparatus of the present invention, the controlling device controls the recording device to record the pre-information in advance, except an area portion in the first area in which the pre-information is recorded in advance.

According to this aspect, the area portion in which the pre-information is pre-recorded is not redundantly overwritten with the pre-information. Therefore, there is no need to perform unnecessary pre-recording, so that it is possible to perform efficient pre-recording. Moreover, there is an advantage that the content of the efficient pre-information is not damaged by the overwriting.

In another aspect of the first recording apparatus of the present invention, the record information is recorded into the first recording layer in one direction, and the record information is recorded into the second recording layer in another direction different from the one direction.

According to this aspect, it is possible to receive the above-mentioned various benefits when the record information is recorded onto the recording medium in the opposite track path method.

In another aspect of the first recording apparatus of the present invention, the tolerance length is or is set to substantially 40 μm in a radial direction of the recording medium. Namely, the controlling device controls the recording device to pre-record the pre-information as the record information, into an area portion as being one portion of the first area, other than an area portion having a size of 40 μm in a radial direction of the recording medium, which is equivalent to the area portion having a size corresponding to the tolerance length.

According to this aspect, in the case of a DVD-R, which is one standard of the recording medium, for example, the acceptable range of the position shift in each recording layer is defined to be from −20 μm to 20 μm. In other words, a relative position shift of −40 μm to 40 μm is allowed between the first recording layer and the second recording layer. Therefore, by performing the pre-recording on the basis of the tolerance length in view of the acceptable range, it is possible to preferably receive the above-mentioned various benefits. Of course, if a different value is determined as the acceptable range of the position shift in another standard, it is preferable to use the value instead of 40 μm.

In another aspect of the first recording apparatus of the present invention, the clearance length is or is set to substantially 84 μm. Namely, the sum of (i) the spot radius of the laser light on the first recording layer if the laser light is focused on the second recording layer and (ii) the relative eccentric shift of the first and second recording layers or the acceptable range of the eccentric shift is substantially 84 μm.

According to this aspect, in the case of the DVD-R or the like, which is one standard of the recording medium, for example, it is possible to preferably perform the pre-recording in view of the clearance.

The above object of the present invention can be also achieved by a second recording apparatus provided with: a recording device for recording record information by irradiating laser light onto a recording medium provided with: (i) a first recording layer which is irradiated with the laser light to thereby record therein the record information and which has a first area in which the record information is recorded; and (ii) a second recording layer which is irradiated with the laser light through the first recording layer to thereby record therein the record information and which has a second area in which the recorded information is recorded by irradiating the second area with the laser light through an area portion of the first recording layer in which the record information is unrecorded; and a controlling device for controlling the recording device to record pre-information in advance as the record information, into an area portion as being one portion of the first area, at least other than an area portion having a size corresponding to a tolerance length, which indicates an acceptable range of a relative position shift between an address which is defined on the predetermined position in the first recording layer and an address which is related to the predetermined position in the second recording layer, with a position of the first recording layer corresponding to at least one of an edge on an inner circumferential side and an edge on an outer circumferential side of an area portion in the second area in which the record information is unrecorded as a starting point.

According to the second recording apparatus of the present invention, as in the first recording apparatus, by the operation of the recording device, it is possible to record the record information onto the recording medium. Moreover, by the operation of the controlling device, the pre-information is recorded into an area portion as being one portion of the first area, before the finalizing.

Particularly in the second recording apparatus, the pre-information is pre-recorded into an area portion as being one portion of the first area, at least other than an area portion having a size corresponding to the tolerance length, from a position of the first recording layer corresponding to at least one of the edge on the inner circumferential side and the edge on the outer circumferential side of an area portion in the second area in which the record information is unrecorded. In other words, even if the edge on the outer circumferential side of the first area does not correspond to the edge on the inner circumferential side of the second area, it is possible to receive the same benefits as those owned by the first recording apparatus.

Therefore, according to the second recording apparatus of the present invention, as in the above-mentioned first recording apparatus, it is possible to preferably perform the pre-recording in order to reduce a time length required for the finalizing, even on the information recording medium having a plurality of recording layers.

Incidentally, in response to the various aspects of the above-mentioned first recording apparatus of the present invention, the second recording apparatus of the present invention can adopt various aspects.

(Recording Method)

The above object of the present invention can be also achieved by a first recording method in a recording apparatus provided with: a recording device for recording record information by irradiating laser light onto a recording medium provided with: (i) a first recording layer which is irradiated with the laser light to thereby record therein the record information and which has a first area in which the record information is recorded; and (ii) a second recording layer which is irradiated with the laser light through the first recording layer to thereby record therein the record information and which has a second area whose edge on an inner circumferential side corresponds to an edge on an outer circumferential side of the first area, the recording method provided with: a first controlling process of controlling the recording device to record the record information; and a second controlling process of controlling the recording device to record pre-information in advance as the record information, into an area portion as being one portion of the first area, at least other than an area portion having a size corresponding to a tolerance length, which indicates an acceptable range of a relative position shift between an address which is defined on the predetermined position in the first recording layer and an address which is related to the predetermined position in the second recording layer, with the edge on the outer circumferential side of the first area as a starting point.

According to the first recording method of the present invention, it is possible to receive the same benefits as those owned by the above-mentioned first recording apparatus of the present invention.

Incidentally, in response to the various aspects of the above-mentioned first recording apparatus of the present invention, the first recording method of the present invention can adopt various aspects.

The above object of the present invention can be also achieved by a second recording method in a recording apparatus provided with: a recording device for recording record information by irradiating laser light onto a recording medium provided with: (i) a first recording layer which is irradiated with the laser light to thereby record therein the record information and which has a first area in which the record information is recorded; and (ii) a second recording layer which is irradiated with the laser light through the first recording layer to thereby record therein the record information and which has a second area in which the recorded information is recorded by irradiating the second area with the laser light through an area portion of the first recording layer in which the record information is unrecorded, the recording method provided with: a first controlling process of controlling the recording device to record the record information; and a second controlling process of controlling the recording device to record pre-information in advance as the record information, into an area portion as being one portion of the first area, at least other than an area portion having a size corresponding to a tolerance length, which indicates an acceptable range of a relative position shift between an address which is defined on the predetermined position in the first recording layer and an address which is related to the predetermined position in the second recording layer, with a position of the first recording layer corresponding to at least one of an edge on an inner circumferential side and an edge on an outer circumferential side of an area portion in the second area in which the record information is unrecorded as a starting point.

According to the second recording method of the present invention, it is possible to receive the same benefits as those owned by the above-mentioned second recording apparatus of the present invention.

Incidentally, in response to the various aspects of the above-mentioned second recording apparatus of the present invention, the second recording method of the present invention can adopt various aspects.

(Computer Program)

The above object of the present invention can be also achieved by a computer program of instructions for recording control and for tangibly embodying a program of instructions executable by a computer provided in the first or second recording apparatus (including its various aspects), to make the computer function as at least one portion of the recording apparatus (specifically, e.g. the controlling device).

According to the computer program of the present invention, the above-mentioned first or second recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned first or second recording apparatus of the present invention, the computer program of the present invention can adopt various aspects.

The above object of the present invention can be also achieved by a computer program product in a computer-readable medium for tangibly embodying a program of instructions executable by a computer provided in the above-mentioned first or second recording apparatus of the present invention (including its various aspects), to make the computer function as at least one portion of the recording apparatus (specifically, e.g. the controlling device).

According to the computer program product of the present invention, the above-mentioned first or second recording apparatus can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned first or second recording apparatus.

These effects and other advantages of the present invention will become more apparent from the following embodiments.

As explained above, the first or second recording apparatus of the present invention is provided with the recording device and the controlling device. The first or second recording method of the present invention is provided with the first controlling process and the second controlling process. Therefore, it is possible to preferably perform the pre-recording in order to reduce a time length required for the finalizing, even on the information recording medium having a plurality of recording layers.

BRIEF DESCRIPTION OF DRAWINGS

FIG. 1 are a substantial plan view showing the basic structure of an optical disc in an embodiment of the present invention, and a schematic cross sectional view of the optical disc and a corresponding conceptual diagram showing a recording area structure in the radial direction.

FIG. 2 is a block diagram conceptually showing the basic structure of a recording/reproducing apparatus in the embodiment.

FIG. 3 is a flowchart conceptually showing a flow of a pre-recording operation into a middle area, out of the recording operation of the recording/reproducing apparatus in the embodiment.

FIG. 4 are schematic conceptual views conceptually showing a position tolerance.

FIG. 5 are schematic conceptual views conceptually showing an eccentric clearance out of clearance.

FIG. 6 are schematic conceptual views conceptually showing a spot clearance out of clearance.

FIG. 7 is a graph conceptually showing a specific example of a corresponding equation.

FIG. 8 is a schematic conceptual view schematically showing a relationship between each area and an address on the optical disc when dummy data or the like is pre-recorded into the middle area.

FIG. 9 is a schematic conceptual view schematically showing the relationship between each area and the address on the optical disc if the dummy data or the like is already pre-recorded in the middle area.

FIG. 10 is a schematic conceptual view showing the specific value of the address of a DVD-R with a diameter of 12 cm, which is one specific example of the optical disc.

FIG. 11 is a schematic conceptual view showing the specific value of the address of a DVD-R with a diameter of 8 cm, which is another specific example of the optical disc.

FIG. 12 is a flowchart conceptually showing a flow of a first modified operation example.

FIG. 13 is a schematic conceptual view schematically showing the relationship between each area and the address on the optical disc when the dummy data or the like is pre-recorded into the middle area in the case where an ODTA is used.

FIG. 14 is a schematic conceptual view schematically showing the relationship between each area and the address on the optical disc if the dummy data or the like is already pre-recorded in the middle area in the case where the ODTA is used.

FIG. 15 is a flowchart conceptually showing a flow of a second modified operation example.

FIG. 16 is a schematic conceptual view schematically showing the relationship between each area and the address on the optical disc when the dummy data or the like is pre-recorded into the middle area in the case where an ODTA is newly used;

DESCRIPTION OF REFERENCE CODES

100 Optical disc
109, 119 Middle area
104, 114 ODTA
200 Recording/reproducing apparatus
352 Optical pickup
353 Signal recording/reproducing device
354, 359 CPU
355, 360 Memory

BEST MODE FOR CARRYING OUT THE INVENTION

Hereinafter, the best mode for carrying out the invention will be explained in each embodiment in order, with reference to the drawings.

At first, with reference to FIG. 1, an explanation will be given to an optical disc on which data is recorded and reproduced by a recording/reproducing apparatus 200 (refer to FIG. 2) as being an embodiment according to the recording apparatus of the present invention. FIG. 1(a) is a substantial plan view showing the basic structure of an optical disc in the embodiment, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a center hole 101 as being the center; a lead-in area 102 or a lead-out area 118; data areas 105 and 115; and middle areas 109 and 119. At this time, the middle area 109 constitutes one specific example of the "first area" of the present invention. Then, in the optical disc 100, recording layers or the like are laminated on a transparent substrate 110, for example. In each recording area of the recording layers, a track or tracks, such as groove tracks and land tracks, are alternately placed, spirally or concentrically, with the center hole 101 as the center. Moreover, on the track, data is divided by a unit of ECC block and recorded. The ECC block is a data management unit by which the recording information can be error-corrected.

Incidentally, the present invention is not particularly limited to the optical disc having the three areas as described above. For example, even if the lead-in area 102, the lead-out area 118 or the middle area 109 (119) do not exist, a data structure and the like explained below can be constructed. Moreover, as described later, the lead-in area 102 and the lead-out area 118 or the middle area 109 (119) may be further segmentized.

Particularly, the optical disc 100 in the embodiment, as shown in FIG. 1(b), has such a structure that an L0 layer and an L1 layer, which constitute one example of the "first and second recording layers" of the present invention, respectively, are laminated on the transparent substrate 110. Upon the recording and reproduction of such a dual-layer type optical disc 100, the data recording/reproduction in the L0 layer or the L1 layer is performed, depending on which recording layer has the focus position of laser light LB, irradiated from the lower side to the upper side in FIG. 1(b). In particular, in the L0 layer, the data is recorded from the inner to the outer circumferential side, while in the L1 layer, the data is recorded from the outer to the inner circumferential side. In other words, the optical disc 100 in the embodiment corresponds to an optical disc in the opposite track path method. Even an optical disc in a parallel track path method can also receive various benefits described later, by adopting a structure discussed below.

The optical disc 100 in the embodiment is provided with RMA (Recording Management Areas) 103 and 113 on the inner circumferential side of the lead-in area 102 and the lead-out area 118, and ODTA (Outer Disc Testing Areas) 104 and 114 on the outer circumferential side of the middle areas 109 and 119.

The RMA 103 and 113 are recording areas to record therein various management information for managing the recording of the data onto the optical disc 100. Specifically, the management information or the like which indicates the arrangement or the recording state or the like of the data recorded on the optical disc 100, for example, is recorded.

The ODTA 104 and 114 are recording areas to perform an OPC (Optimum Power Control) process of adjusting (or calibrating) the laser power of laser light LB, in recording the data onto the optical disc 100. An OPC pattern is recorded into the ODTA 104 and 114 while the laser power is changed in stages and the reproduction quality (e.g. asymmetry, etc.) of the recorded OPC pattern is measured, by which an optimum laser power in recording the data is calculated. In particular, the ODTA 114 of the L1 layer, which constitutes one specific example of the "second area" of the present invention, is located adjacent to the middle area 119, and the ODTA 114 of the L1 layer is located not to overlap the ODTA 104 of the L0 layer and the middle area 109, as viewed from the irradiation side of the laser light LB. In order to preferably perform the OPC process without influence of the other recording layer, when the OPC process is performed by using the ODTA 114 of the L1 layer, the OPC pattern is recorded through the L0 layer in which the data is unrecorded. Obviously, the same is true for the ODTA 104 of the L0 layer.

Moreover, the optical disc 100 in the embodiment is not limited to a dual-layer, single-sided type, but may be a dual-layer, double-sided type. Furthermore, the optical disc 100 in the embodiment is not limited to the optical disc having the two recording layers, as described above, but may be an optical disc of a multilayer type which has three or more layers.

(Recording/Reproducing Apparatus)

Next, with reference to FIG. 2 to FIG. 16, the structure and operation of the recording/reproducing apparatus 200, as being an embodiment according to the recording apparatus of the present invention, will be explained.

(1) Basic Structure

At first, with reference to FIG. 2, the basic structure of the recording/reproducing apparatus 200 will be discussed. FIG. 2 is a block diagram conceptually showing the basic structure of the recording/reproducing apparatus 200 in the embodiment. Incidentally, the recording/reproducing apparatus 200 has a function of recording the data onto the optical disc 100 and a function of reproducing the data recorded on the optical disc 100.

As shown in FIG. 2, the recording/reproducing apparatus 200 is provided with: a disc drive 300 into which the optical disc 100 is actually loaded and in which the data is recorded and reproduced; and a host computer 400, such as a personal computer, for controlling the recording and reproduction of the data with respect to the disc drive 300.

The disc drive 300 is provided with: the optical disc 100; a spindle motor 351; an optical pickup 352; a signal recording/reproducing device 353; the CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 constitutes one specific example of the "recording device" of the present invention and is provided with a semiconductor laser device, a lens, and the like, to perform the recording/reproduction with respect to the optical disc 100. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver;

a head amplifier; and the like, for example. The laser diode driver (LD driver) drives a not-illustrated semiconductor laser device located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser device located in the optical pickup 352, in order to determine an optimum laser power by the recording and reproduction processes for the OPC pattern, together with a not-illustrated timing generator or the like, under the CPU 354, upon the OPC process.

The memory 355 is used in the whole data processing and the OPC process or the like on the disc drive 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like.

The CPU (drive control device) 354 is connected to the signal-recording/reproducing device 353 and the memory 355 through the bus 357, and controls the entire disc drive 300 by giving an instruction to various controlling devices. Normally, software or firmware for operating the CPU 354 is stored in the memory 355.

The data input/output control device 306 controls the input/output of the data from the exterior with respect to the disc drive 300, to thereby perform storage to and export from the data buffer on the memory 355. A drive control command issued from the external host computer 400 connected to the disc drive 300 through an interface, such as a SCSI and an ATAPI, is transmitted to the CPU 354 through the data input/output control device 306. Moreover, the record/reproduction data is also transmitted to and received from the host computer 400 through the data input/output control device 306, in the same manner.

The operation/display control device 307 receives an operation instruction and performs display with respect to the host computer 400, and transmits an instruction by the operation button 310, such as an instruction to record or reproduce, to the CPU 359. The CPU 359 may transmit a control command to the disc drive 300, through the data input/output control device 308, on the basis of instruction information from the operation/display control device 307, to thereby control the entire disc drive 300. In the same manner, the CPU 359 can transmit a command for requesting the disc drive 300 to transmit an operational state to the host, with respect to the disc drive 300. By this, the operational state of the disc drive 300, such as during recording and during reproduction, can be recognized, so that the CPU 359 can output the operational state of the disc drive 300 to the display panel 310, such as a fluorescent tube and an LCD, through the operation/display control device 307.

The memory 360 is an inner storage apparatus used by the host computer 400, and is provided with: a ROM area into which a firmware program, such as a BIOS (Basic Input/Output System), is stored; a RAM area into which a parameter required for the operation of an operating system and an application program or the like is stored; and the like. Moreover, the memory 360 may be connected to a not-illustrated external storage apparatus, such as a hard disk, through the data input/output control device 308.

One specific example used by combining the disc drive 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 360, on the CPU 359. Moreover, in another specific example, the disc drive 300 is a disc drive (hereinafter referred to as a "drive", as occasion demands), and the host computer 400 is a personal computer and a work station. The host computer, such as the personal computer, and the drive are connected through the data input/output control devices 306 and 308, such as the SCSI and the ATAPI, and application, such as writing software, installed in the host computer 400 controls the disc drive 300.

(2) Operation Principle

Next, with reference to FIG. 3 to FIG. 11, the recording operation of the recording/reproducing apparatus 200 in the embodiment will be discussed. Here, the overall outline of the operation principle will be explained by using FIG. 3, and supplementary or more detailed explanation will be given by using FIG. 4 to FIG. 11. FIG. 3 is a flowchart conceptually showing a flow of a pre-recording operation into the middle areas 109 and 119, out of the recording operation of the recording/reproducing apparatus 200 in the embodiment.

The recording/reproducing apparatus 200 records movie data, audio data, data for PC or the like into the data areas 105 and 115. At this time, as a general rule, it records the data into the data area 115 of the L1 layer after recording the data into the data area 105 of the L0 layer. In other words, the recording/reproducing apparatus 200 records the data into the data area 115 of the L1 layer, by irradiating the L1 layer with the laser light LB through the data area 105 of the L0 layer in which the data is already recorded. The same is true for other recording areas, as a general rule. At this time, the recording/reproducing apparatus 200 pre-records dummy data (e.g. "00h" data, etc.) into the middle areas 109 and 119, as occasion demands, if needed. The pre-recording will be discussed below.

As shown in FIG. 3, under the control of the CPU 354 or 359, which constitutes one specific example of the "controlling device" of the present invention, at first, the position tolerance of each of the L0 layer and the L1 layer is obtained (step S101). Instead of obtaining the position tolerance, the acceptable value of the position tolerance in the standard may be obtained as the position tolerance. The position tolerance is a value of a position shift between a position where a predetermined address in design is to be originally disposed and a position where the predetermined address is actually disposed on the optical disc 100 or an acceptable range of the position shift. Now, the position tolerance will be explained in more detail, with reference to FIG. 4. FIG. 4 are schematic conceptual views conceptually showing the position tolerance.

As shown in FIG. 4(a), it is assumed that an address "X" is defined at a radial position "r" in design. By this, the arrangement of the lead-in area 101, the data areas 105 and 115, the lead-out area 118, and the middle areas 109 and 119 is defined, in design. At this time, there is likely a case where the address "X" is not accurately defined at the radial position "r" where the address "X" is to be originally defined, due to manufacturing errors of a stampa or the like, which is to form a land pre-pit or wobble which defines the address; in other words, due to manufacturing errors of an original disc for producing the stampa, errors in the radial position of a cutting machine for producing the original disc, uneven track pitches, or the like. Alternatively, there is likely a case where the address "X" is not accurately defined at the radial position "r" where the address "X" is to be originally defined, due to an individual difference by heat contraction or the like in the production of the optical disc 100.

Specifically, as shown in FIG. 4(b), it is likely that an address "X+ΔX" is defined at the radial position "r" where the address "X" is to be originally defined. At this time, the address "X" is defined at a radial position "r-Δr1" obtained by shifting from the radial position "r" to the inner circumferential side by "Δr1". A value of "Δr1" or the acceptable range of "Δr1" is referred to the position tolerance. The position tolerance is likely caused in each recording layer, so that in the step S101 in FIG. 3, the position tolerance is obtained in both the L0 layer and the L1 layer. Incidentally, if the state of FIG. 4(b) indicates the state that the position tolerance is caused, FIG. 4(a) is a view which indicates the state that position tolerance is "0".

In FIG. 3 again, a layer tolerance, which constitutes one specific example of the "tolerance length" of the present invention, is calculated, by adding the position tolerance in the L0 layer to the position tolerance in the L1 layer, obtained in the step S101, under the control of the CPU 354 or 359 (step S102). Namely, the layer tolerance indicates the acceptable range of a relative position shift (or the relative position shift itself) between (i) the address which is defined on a predetermined radial position in the L0 layer and (ii) the address which is related to the predetermined radial position in the L1 layer (i.e. the address which is defined on the predetermined radial position in the L1 layer).

Then, a clearance is calculated (step S103). Specifically, a clearance related to an eccentricity corresponding to a shift of the center positions or the like of the L0 layer and the L1 layer (hereinafter referred to as an "eccentric clearance", as occasion demands) and a clearance related to the size of a beam spot of the defocused laser light (hereinafter referred to as a "spot clearance", as occasion demands) are calculated and added. Now, the clearance will be discussed with reference to FIG. 5 and FIG. 6. FIG. 5 are schematic conceptual views conceptually showing the eccentric clearance out of the clearance. FIG. 6 are schematic conceptual views conceptually showing the spot clearance out of the clearance.

As shown in FIG. 5(a), in the case of the optical disc 100 without an eccentricity, the address "X" defined at the radial position "r" in the L0 layer and an address "Y" defined at the radial position "r" in the L1 layer are in such a relationship that they face (or are opposed) to each other on the track of the radius "r". Incidentally, the eccentricity is a relative shift of the L0 layer and the L1 layer, caused by a shift of the center positions of the both layers, a position shift of the center positions in pasting the L0 layer and the L1 layer, or the like.

On the other hand, as shown in FIG. 5(b), in the case of the optical disc 100 with an eccentricity, the address "X" defined at the radial position "r" in the L0 layer and the address "Y" defined at the radial position "r" in the L1 layer face only at two points on the track of the radius "r". In other words, the address "X" of the L0 layer and the address "Y" of the L1 layer, which are to be originally defined at the facing positions, do not face in most places. Specifically, the sum of the eccentricity in the L0 layer and the L1 layer corresponds to the eccentric clearance. In the case of FIG. 5(b), the address "X" of the L0 layer is located away from the address "Y" of the L1 layer, on the outer circumferential side, by "Δr2" corresponding to the amount of the eccentricity. The maximum value of "Δr2" corresponds to the eccentric clearance.

Moreover, as shown in FIG. 6(a), if the laser light LB is focused on the L1 layer, a beam spot with a predetermined radius of "Δr3" is formed on the L0 layer. Now, as described above, a case where the data is recorded into the L1 layer by irradiating the L1 layer with the laser light LB through the L0 layer in which the data is recorded, is considered. As shown in FIG. 6(a), in the case where the data is recorded until the address "X" of the L0 layer, if the laser light LB is focused on the address "Y" of the L1 layer which faces the address "X", the L1 layer is irradiated with the left half of the laser light LB through the L0 layer in which the data is recorded, while the L1 layer is irradiated with the right half of the laser light LB through the L0 layer in which the data is unrecorded. Therefore, only by recording the data into the L1 layer which faces the L0 layer in which the data is recorded without considering the above case, it is impossible to preferably record the data into the L1 layer by irradiating the L1 layer with the laser light LB through the L0 layer in which the data is recorded Thus, as shown in FIG. 6(b), it is necessary to shift the focus position of the laser light LB in the case where the data is recorded into the L1 layer, to the inner circumferential side, by a distance corresponding to the radius "Δr3" of the beam spot, from the position represented by the address "Y" of the L1 layer which faces the address "X" of the L0 layer in which the data is recorded. Specifically, it is necessary to focus the laser light LB on a position represented by an address "Y-ΔX" obtained by shifting to the inner circumferential side by a variable "ΔX" of the address corresponding to the radius "Δr3" of the beam spot. The maximum value of the radius "Δr3" of the beam spot corresponds to the spot clearance.

In the step S103 in FIG. 3, the clearance is calculated by adding the eccentric clearance, explained in FIG. 5, to the spot clearance, explained in FIG. 6.

In FIG. 3 again, under the control of the CPU 354 or 359, the total amount (sum) "L" of the layer tolerance calculated in the step S102 and the clearance calculated in the step S103 is calculated (step S104). Then, under the control of the CPU 354 or 359, a most outer circumferential address (i.e. an address "C" in the edge portion on the outer circumferential side) "C" of the middle area 109 in the L0 layer is calculated (step S105). Then, under the control of the CPU 354 or 359, an address located on position which is shifted by the distance "L" toward the inner circumferential side from the position represented by the address "C" is calculated as an address "B" where the pre-recording is ended, on the basis of a corresponding equation (step S106). At this time, the most outer circumferential position of the middle area 109 and a most inner circumferential position (i.e. an edge portion on the inner circumferential side) of the ODTA 114 have a correspondence relationship (i.e. they are defined at facing positions in design), so that, in other words, an address located on the position which is shifted by the distance "L" toward the inner circumferential side from a position of the L0 layer corresponding to the most inner circumferential position of the ODTA 114 is calculated as the address "B". The corresponding equation used in the step S106 indicates a correspondence relationship between the size of the recording area (e.g. distance in the radial direction) and the size of the data recorded in the recording area (e.g. the number of ECC blocks). The corresponding equation will be discussed in detail with reference to FIG. 7. FIG. 7 is a graph conceptually showing a specific example of the corresponding equation.

As shown in FIG. 7, the corresponding equation is shown by a graph (or function), wherein the distance "L" in the radial direction is assigned to the horizontal axis and the number of ECC blocks is assigned to the vertical axis. At this time, a plurality of graphs depending on the type of the optical disc 100 may be defined as the corresponding equation. For example, as shown in FIG. 7, in accordance with the size of the optical disc 100, the corresponding equation (for example, the number of ECC blocks=5.442×L) of an optical disc with a diameter of 12 cm and the corresponding equation (for example, the number of ECC blocks=3.5687×L) of an optical disc with a diameter of 8 cm may be defined. From the graph, it is possible to obtain the size of the data which can be recorded into the recording area with the distance in the radial direction of "L". For example, if "L=124 μm", the data with a size of 675ECC blocks can be recorded in the optical disc with a diameter of 12 cm, and the data with a size of 443ECC blocks can be recorded in the optical disc with a diameter of 8 cm.

Incidentally, the corresponding equation may be stored in advance in the memory 355 or 360 in the recording/reproducing apparatus 200, which constitutes one specific example of the "storing device" of the present invention, or may be recorded on the optical disc 100. Moreover, it is obvious that the corresponding equation is not limited to the aspect shown in FIG. 7. For example, it may be a predetermined table. In short, information for defining a relationship between the distance in the radial direction and the size of the data which can be recorded in the distance can be used as the above-mentioned corresponding equation.

The size of the data which can be recorded in the recording area with the distance in the radial direction of "L", which is obtained by using the corresponding equation of FIG. 7, is used in calculating the address B. This is because the recording/reproducing apparatus 200 cannot easily calculate the address "B" even if "L" is merely obtained as the distance in the radial direction. That is because the recording/reproducing apparatus 200 has difficulty in recognizing the position of the recording area in the L0 layer and the L1 layer by the "distance in the radial direction" and recognizes it by the address position. At this time, the data in a predetermined size is recorded in a predetermined address range, so that it is enough to make the recording/reproducing apparatus 200 recognize the distance in the radial direction of "L", as the size of the data. If the recording/reproducing apparatus 200 recognizes the distance in the radial direction of "L", as the size of the data which can be recorded in the recording area with the distance "L" in the radial direction, it is possible to relatively easily calculate the address "B" by shifting to the inner circumferential side by the address corresponding to the size, from the position of the address "C".

In FIG. 3 again, after that, RMD (Recording Management Data) recorded in the RMA 103 or 113 is obtained (step S107). The RMD includes information which indicates the recording state of the data on the optical disc 100 (i.e. which recording area has the data recorded, or which recording area does not have the data recorded).

Then, under the control of the CPU 354 or 359, it is judged whether or not the dummy data or the like is already pre-recorded in the middle area 109 of the L0 layer (step S108). This judgment is performed on the basis of the RMD obtained in the step S107.

As a result of the judgment, if it is judged that the dummy data or the like is not pre-recorded in the middle area 109 of the L0 layer (the step S108: No), an address next to the most outer circumferential address value of the data area 105 which is assigned to a land pre-pit or the like (i.e. the most inner circumferential address of the middle area 109) is obtained as an address "A" where the pre-recording is started, under the control of the CPU 354 or 359 (step S109). On the other hand, if it is judged that the dummy data or the like is pre-recorded in the middle area 109 of the L0 layer (the step S108: Yes), an address value next to the most outer circumferential address of the pre-recorded dummy data or the like (i.e. the most outer circumferential address of the recording area in which the dummy data or the like is pre-recorded, out of the middle area 109) is obtained as the address "A", on the basis of the RMD obtained in the step S107, under the control of the CPU 354 or 359 (step S110).

Then, under the control of the CPU 354 or 359, it is judged whether or not the address "B" calculated in the step S106 is located on the outer circumferential side of the address "A" obtained in the step S109 or the step S110 (step S111).

As a result, if it is judged that the address "B" is located on the outer circumferential side of the address "A" (the step S111: Yes), predetermined dummy data or the like is pre-recorded into the recording area from the address "A" to the address "B" out of the middle area 109 of the L0 layer, under the control of the CPU 354 or 359 (step S112). On the other hand, if it is judged that the address "B" is not located on the outer circumferential side of the address "A" (the step S111: No), the dummy data or the like is not pre-recorded into the middle area 109 of the L0 layer, under the control of the CPU 354 or 359.

The aspect on the optical disc 100 at this time will be explained with reference to FIG. 8 and FIG. 9. FIG. 8 is a schematic conceptual view schematically showing a relationship between each area and the address on the optical disc 100 when the dummy data or the like is pre-recorded into the middle area 109. FIG. 9 is a schematic conceptual view schematically showing the relationship between each area and the address on the optical disc 100 if the dummy data or the like is already pre-recorded in the middle area 109.

As shown in FIG. 8, if the dummy data is not pre-recorded in advance in the middle area 109, the most inner circumferential address of the middle area 109 in the L0 layer corresponds to the address "A", the most outer circumferential address of the middle area 109 in the L0 layer corresponds to the address "C", and the address of the position obtained by shifting to the inner circumferential side by the distance "L" from the edge portion on the outer circumferential side of the middle area 109 in the L0 layer corresponds to the address "B". Then, under the control of the CPU 354 or 359, the dummy data is pre-recorded into the recording area from the address "A" to the address "B", out of the middle area 109. At this time, as shown in FIG. 8, it is possible to record the OPC pattern into the ODTA 114 of the L1 layer, by irradiating the L1 layer with the laser light LB through the L0 layer in which the data is unrecorded. In other words, if the OPC pattern is recorded into the ODTA 114 of the L1 layer, the laser light LB is not irradiated through the layer in which the data is recorded. In particular, the recording area as one portion of the middle area 109 in which the dummy data or the like is recorded is determined, in view of the layer tolerance and the clearance, as described above. Namely, after a margin is ensured in view of both the layer tolerance and the clearance, the dummy data or the like is recorded into the middle area 109. Thus, even if there arises a relative position shift between the L0 layer and the L1 layer due to the occurrence of the eccentricity and the position tolerance, it is possible to record the OPC pattern into the ODTA 114 of the L1 layer by irradiating the L1 layer with the laser light LB through the L0 layer in which the data is unrecorded, with or without the dummy data pre-recorded in the middle area 109.

Incidentally, FIG. 8 shows a case where there arise the eccentricity in which the center of the L0 layer is shifted to the outer circumferential side, as compared to the center of the L1 layer, the position tolerance in which the middle area 109 of the L0 layer is shifted to the outer circumferential side, and the position tolerance in which the ODTA 114 of the L1 layer is shifted to the inner circumferential side. In other words, it shows the worst case where the middle area 109 of the L0 layer and the ODTA 114 of the L1 layer are overlapped most. Even in the worst case, if the dummy data or the like is pre-recorded into the middle area 109 in view of the layer tolerance and the clearance, as described above, it is possible to record the OPC pattern into the ODTA 114 of the L1 layer by irradiating the L1 layer with the laser light LB through the L0 layer in which the data is unrecorded, as shown in FIG. 8.

Moreover, as shown in FIG. 9, if the dummy data or the like is already pre-recorded in one portion of the middle area 109, the address next to the most outer circumferential address of the recording area in which the dummy data or the like is pre-recorded corresponds to the address "A", the most outer circumferential address of the middle area 109 in the L0 layer corresponds to the address "C", and the address of the position obtained by shifting to the inner circumferential side by the distance "L" from the edge portion on the outer circumferential side of the middle area 109 in the L0 layer corresponds to the address "B". Then, under the control of the CPU 354 or 359, the dummy data or the like is pre-recorded into the recording area from the address "A" to the address "B" out of the middle area 109. Even in this case, as in the case of FIG. 8, even if there arises a relative position shift between the L0 layer and the L1 layer due to the occurrence of the eccentricity and the position tolerance, it is possible to record the OPC pattern into the ODTA 114 of the L1 layer by irradiating the L1 layer with the laser light LB through the L0 layer in which the data is unrecorded, with or without the dummy data pre-recorded in the middle area 109.

If the specific value of the address is applied, it is like FIG. 10 and FIG. 11. FIG. 10 is a schematic conceptual view showing the specific value of the address of a DVD-R with a diameter of 12 cm, which is one specific example of the optical disc 100. FIG. 11 is a schematic conceptual view showing the specific value of the address of a DVD-R with a diameter of 8 cm, which is another specific example of the optical disc 100.

Incidentally, in FIG. 10 and FIG. 11, in accordance with "20 µm" as being the acceptable range of the position tolerance in the standard in each recording layer, "40 µm" is used as a specific numerical value of the layer tolerance. Moreover, "84 µm" is used as a specific numerical value of the clearance. Namely, the explanation is made in the case where L=84+40=124 µm. Moreover, FIG. 10 and FIG. 11 show the case where a decrement address method is adopted in which the address decreases toward the outer circumferential side in the L0 layer and the address decreases toward the inner circumferential side in the L1 layer. Of course, in the case of an increment address method in which the address increases toward the outer circumferential side in the L0 layer and the address increases toward the inner circumferential side in the L1 layer, the specific-value is different.

As shown in FIG. 10, in the case of the DVD-R with a diameter of 12 cm, the address "A" (i.e. the most inner circumferential address of the middle area 109 in the L0 layer) is "FDD109h", and the address "C" (i.e. the position of the L0 layer corresponding to the most inner circumferential position of the ODTA 114 in the L1 layer) is "FDCCCAh". Then, it can be seen from the graph of FIG. 7 that the size of the data which can be recorded in the recording area with the distance L in the radial direction L=124 µm is 675 ECC blocks (=2A3hECC blocks). Therefore, the address "B" is "FDCCCAh"+"2A3h"="FDCF6Dh". For reference, the most inner circumferential address of the middle area 119 in the L1 layer is "022EF6h", and most inner circumferential address of the ODTA 114 in the L1 layer is "023574h".

Moreover, as shown in FIG. 11, in the case of the DVD-R with a diameter of 8 cm, the address "A" is "FF3030h", and the address "C" is "FF2D67h". Then, it can be seen from the graph of FIG. 7 that the size of the data which can be recorded in the recording area with the distance L in the radial direction of L=124 µm is 443 ECC blocks (=1BBhECC blocks). Therefore, the address "B" is "FF2D67h"+"1BBh"="FF2F22h". For reference, the most inner circumferential address of the middle area 119 in the L1 layer is "00CFCFh", and most inner circumferential address of the ODTA 114 in the L1 layer is "00D4D7h".

Incidentally, FIG. 10 and FIG. 11 show the case where the middle areas 109 and 119 are disposed at positions determined in advance in the standard. However, it is obvious that the middle areas 109 and 119 may be constructed to be located on the further inner circumferential side if the size of the data recorded in the data areas 105 and 115 is small.

As explained above, according to the recording/reproducing apparatus 200 in the embodiment, the recording area as one portion of the middle area 109 in which the dummy data or the like is recorded is determined, without influence on the recording of the OPC pattern into the ODTA 114, in view of the layer tolerance and the clearance. Thus, even if there arises a relative position shift between the L0 layer and the L1 layer due to the occurrence of the eccentricity and the position tolerance, it is possible to record the OPC pattern into the ODTA 114 of the L1 layer by irradiating the L1 layer with the laser light LB through the L0 layer in which the data is unrecorded, with or without the dummy data pre-recorded in the middle area 109. Thus, it is possible to preferably perform the OPC process by using the ODTA 114.

Moreover, since the dummy data or the like can be pre-recorded into the middle area 109 before the finalizing, it is possible to reduce a time length required for the finalizing. In summary, according to the recording/reproducing apparatus 200 in the embodiment, there is such a great advantage which cannot be realized by an existing recording/reproducing apparatus that although it can reduce a time length required for the finalizing, it does not have an adverse effect on the OPC process performed by using the ODTA 114.

In addition, according to the recording/reproducing apparatus 200 in the embodiment, the address position (specifically, the address "B") is calculated by a data recording unit, on the basis of not the distance in the radial direction of the optical disc 100 but the corresponding equation shown in FIG. 7. Thus, the above-mentioned pre-recording can be performed in a format easily recognized or easily handled by the recording/reproducing apparatus 200. Therefore, it is possible to reduce a processing load required for the recording operation of the recording/reproducing apparatus 200.

Moreover, by using the plurality of corresponding equations, it is possible to determine the recording area as being one portion of the middle area 109 in which the dummy data or the like can be pre-recorded, depending on the type of the optical disc 100 (e.g. depending on the size of the diameter and a difference in the standard). Alternatively, it is possible to determine the recording area as being one portion of the middle area 109 in which the dummy data or the like can be pre-recorded, depending on where the middle area 109 is disposed (e.g. depending on whether the middle area 109 is located relatively on the inner circumferential side of the optical disc 100, or relatively on the middle circumferential side, or relatively on the outer circumferential side).

Incidentally, in the above-mentioned embodiment, the pre-recording in the middle area 109 of the L0 layer is explained;

however, this can be applied to a case where the dummy data or the like is pre-recorded into the lead-in area 102 or the like of the L0 layer. In other words, if there is a recording area in which the data needs to be recorded through the unrecorded L0 layer, in a recording area of the L1 layer corresponding to the lead-in area 102 or the like of the L0 layer (or a recording area adjacent to the corresponding L1 layer), it is possible to determined the recording area as being one portion of the lead-in area 102 or the like in which the dummy data or the like can be pre-recorded, as described above. Moreover, the same can be also applied to the middle area 119 and the lead-out area 118 of the L1 layer.

First Modified Operation Example

Next, with reference to FIG. 12, the first modified operation example of the recording/reproducing apparatus 200 in the embodiment will be discussed. FIG. 12 is a flowchart conceptually showing a flow of the first modified operation example. Incidentally, the same constitutional elements and the same processes as those in the operation, explained with reference to FIG. 3 to FIG. 10, carry the same reference numerals and the same step numbers, and the explanation thereof are omitted, as occasion demands.

The first modified operation example is an operation example in which the dummy data is pre-recorded into the middle area 109 if the OPC pattern or the like is already recorded in the ODTA 114 of the L1 layer. As shown in FIG. 12, the step S101 to the step S110 in FIG. 3 are performed in the same manner even in the first modified operation example.

Then, under the control of the CPU 354 or 359, it is judged whether or not the ODTA 114 of the L1 layer (or one portion thereof) is already used (i.e. whether or not the OPC pattern or the like is already recorded) (step S201).

As a result of the judgment, if it is judged that the ODTA 114 of the L1 layer is already used (the step S201: Yes), a most outer circumferential address "E" of the already-used ODTA 114 (i.e. a most outer circumferential address of the recording area in which the OPC pattern or the like is recorded) is obtained, by referring to the RMD obtained in the step S107, for example, under the control of the CPU 354 or 359 (step S202). Then, a most outer circumferential address "D" of the middle area 119 in the L1 layer, which is assigned to a land pre-pit or the like or which is determined in advance in the standard, is obtained (step S203).

Then, from a difference of the address "D" and the address "E", a size "M" of the data which can be recorded in the recording area between the address "D" and the address "E" is calculated (step S204). In other words, the size of the already-used recording area out of the ODTA 114 in the L1 layer (or the size of the recorded OPC pattern) is calculated. For example, if the decrement address method is adopted, M=D−E. Then, from the address "B" calculated in the step S106, the address value of a position obtained by shifting to the outer circumferential side by the data size "M" is calculated as a new address "B" (step S205). For example, if the decrement address method is adopted, B=B−M. On the other hand, if the increment address method is adopted, B=B+M. In other words, the address value of a position which is obtained by shifting to the inner circumferential side by "L" from the address of the position in the L0 layer corresponding to the position of the L1 layer specified by the address "E", corresponds to the new address "B" calculated in the step S205. Then, the step S111 and the step S112 in FIG. 3 are performed, and the predetermined dummy data is pre-recorded into the recording area from the address "A" to the address "B" out of the middle area 109 in the L0 layer.

On the other hand, if it is judged that the ODTA 114 of the L1 layer is not used yet (i.e. unused) (the step S201: No), the step S111 and the step S112 in FIG. 3 are performed without the above-mentioned step S202 to step S205, and the predetermined dummy data is pre-recorded into the recording area from the address "A" to the address "B" out of the middle area 109 in the L0 layer.

The aspect on the optical disc 100 at this time will be discussed with reference to FIG. 13 and FIG. 14. FIG. 13 is a schematic conceptual view schematically showing the relationship between each area and the address on the optical disc 100 when the dummy data or the like is pre-recorded in the middle area 109 in the case where the ODTA 114 is used. FIG. 14 is a schematic conceptual view schematically showing the relationship between each area and the address on the optical disc 100 if the dummy data or the like is already pre-recorded in the middle area 109 in the case where the ODTA 114 is used.

As shown in FIG. 13, the most inner circumferential address of the middle area 109 in the L0 layer corresponds to the address "A", and the most outer circumferential address of the middle area 109 in the L0 layer corresponds to the address "C". Moreover, the address of the position which is obtained by shifting to the inner circumferential side by the distance "L" and to the outer circumferential side by the data size "M" from the edge portion on the outer circumferential side of the middle area 109 in the L0 layer corresponds to the address "B". This is because if the recording area as being one portion of the ODTA 114 of the L1 layer is used, it is only necessary to record the OPC pattern or the like by irradiating the laser light LB through the L0 layer in which the data is unrecorded, with respect to the recording area of the ODTA 114 other than the one portion. In other words, that is because the recording of the OPC pattern into the not-used ODTA is not adversely affected even if the dummy data is recorded to the further outer circumferential side, since the recording area as being one portion of the ODTA 114 of the L1 layer is used. Then, under the control of the CPU 354 or 359, the dummy data is pre-recorded into the recording area from the address "A" to the address "B", out of the middle area 109.

Moreover, as shown in FIG. 14, even if the dummy data is pre-recorded in advance in the middle area 109, it is obvious that the dummy data or the like may be pre-recorded, in view of the size "M" of the recording area of the ODTA 114 in the L1 layer, which is already used as described above.

As explained above, according to the first modified operation example, even if the ODTA 114 (or one portion thereof is already used, it is possible to determined the recording area as being one portion of the middle area 109 in which the dummy data can be pre-recorded before the finalize process, without adverse effect on the OPC process performed by using the ODTA 114. Therefore, it is possible to receive the above-mentioned various benefits.

Second Modified Operation Example

Next, with reference to FIG. 15, the second modified operation example of the recording/reproducing apparatus 200 in the embodiment will be discussed. FIG. 15 is a flowchart conceptually showing a flow of the second modified operation example. Incidentally, the same constitutional elements and the same processes as those in the operation, explained with reference to FIG. 3 to FIG. 10, carry the same reference numerals and the same step numbers, and the explanation thereof are omitted, as occasion demands.

The second modified operation example is an operation example in which the dummy data is pre-recorded into the middle area 109 if the recording/reproducing apparatus 200 itself newly records the OPC pattern into the ODTA 114 of the L1 layer.

As shown in FIG. 15, the most outer circumferential address "E" of the recording area of the ODTA 114 which was used in the past (i.e. the most outer circumferential address of the recording area of the ODTA 114 in which the OPC pattern or the like was recorded in the past) is obtained (step S301). More specifically, the most outer circumferential address "E" of the recording area of the ODTA 114 which has been already used before the OPC pattern is recorded this time, is obtained.

Then, under the control of the CPU 354 or 359, it is judged whether or not the ODTA 114 of the L1 layer is newly used (i.e. whether or not the OPC pattern or the like is newly recorded into the ODTA 114 of the L1 layer) (step S302).

As a result of the judgment, if it is judged that the ODTA 114 of the L1 layer is newly used (the step S302: Yes), a most outer circumferential address (final address) "F" of the recording area of the newly-used ODTA 114 in the L1 layer is obtained (step S303). Then, out of the middle area 109 of the L0 layer, the address "B" next to the most outer circumferential address of the recording area in which the dummy data or the like is already recorded, is obtained (step S304). Then, from a difference of the address "E" and the address "F", a size "N" of the data which can be recorded in the recording area between the address "E" and the address "F" is calculated (step S305). In other words, the size of the recording area which is newly used this time out of the ODTA 114 in the L1 layer is calculated. For example, if the decrement address method is adopted, N=F−E. On the other hand, if the increment address method is adopted, N=E−F. Then, from the address "B" calculated in the step S304, an address "G" of a position obtained by shifting to the outer circumferential side by the data size "N" is calculated (step S306). For example, if the decrement address method is adopted, G=B−N. On the other hand, if the increment address method is adopted, G=B+N. Then, the predetermined dummy data is pre-recorded into the recording area from the address "B" to the address "G" out of the middle area 109 in the L0 layer.

On the other hand, if it is judged that the ODTA 114 of the L1 layer is not newly used (the step S302: No), the dummy data or the like is not pre-recorded into the middle area 109.

The aspect on the optical disc 100 at this time will be explained with reference to FIG. 16. FIG. 16 is a schematic conceptual view schematically showing the relationship between each area and the address on the optical disc 100 when the dummy data or the like is pre-recorded into the middle area in the case where the ODTA 114 is newly used.

As shown in FIG. 16, out of the ODTA 114, the most outer circumferential address of the recording area which has been already used before the use of the ODTA 114 this time, corresponds to the address "E". Out of the ODTA 114, the most outer circumferential address of the recording area which is newly used this time, corresponds to the address "F". Out of the middle area 109, the address next to the most outer circumferential address of the recording area in which the dummy data or the like is pre-recorded before the pre-recording this time, corresponds to the address "B". The address of the position obtained by shifting to the outer circumferential side by the data size "N" from the position represented by the address "B", corresponds to the address "G". Then, along with the new use of the ODTA 114 this time, the dummy data or the like is newly pre-recorded into the recording area from the address "B" to the address "G". In other words, the dummy data or the like having the same size as the used size of the ODTA 114 this time is newly pre-recorded into the middle area 109.

As explained above, according to the second modified operation example, it is possible to determined the recording area as being one portion of the middle area 109 in which the dummy data can be pre-recorded before the finalize process. Therefore, it is possible to receive the above-mentioned various benefits. In particular, in accordance with the size of the newly used ODTA 114, it is possible to determined the recording area as being one portion of the middle area 109 in which the pre-recording can be newly performed. Thus, there is no need to perform unnecessary pre-recording, so that it is possible to reduce a processing load of the recording/reproducing apparatus 200.

Moreover, in the above-mentioned embodiment, the optical disc 100 is explained as one example of the recording medium, and the recorder or player related to the optical disc 100 is explained as one example of the recording/reproducing apparatus. The present invention, however, is not limited to the optical disc and the recorder thereof, and can be applied to other various recording media, and the recorders or players thereof, which support-high density recording or high transfer rate.

The present invention is not limited to the above-described embodiments, and various changes may be made, if desired, without departing from the essence or spirit of the invention which can be read from the claims and the entire specification. A recording apparatus, a recording method, and a computer program for recording control, which involve such changes, are also intended to be within the technical scope of the present invention.

INDUSTRIAL APPLICABILITY

The recording apparatus, the recording method, and the computer program according to the present invention can be applied to a high-density recording medium, such as a DVD, for example, and also applied to an information recording apparatus, such as a DVD recorder. Moreover, they can be applied to an information recording apparatus or the like, which is mounted on or can be connected to various computer equipment for consumer use or business use, for example.

The invention claimed is:

1. A recording apparatus, comprising:
 a recording device for recording record information by irradiating laser light onto a recording medium comprising: (i) a first recording layer which is irradiated with the laser light to thereby record therein the record information and which has a middle area in which the record information is recorded; and (ii) a second recording layer which is irradiated with the laser light through the first recording layer to thereby record therein the record information and which has an ODTA (Outer Disc Testing Area) whose edge on an inner circumferential side corresponds to an edge on an outer circumferential side of the middle area; and
 a controlling device for controlling said recording device to record pre-information of the record information before a finalizing, into an area portion which is one portion of the middle area and whose addresses range from an address "A" to an address "B1", wherein the address "A" is the most inner circumferential address of the middle area, the address "B1" is an address of the position obtained by shifting toward the inner circumferential side of the middle area by a tolerance length from the edge on the most outer circumferential side of the middle area, and the tolerance length indicates an acceptable range of a relative position shift between an address which is defined on the predetermined position in the first recording layer and an address which is related to the predetermined position in the second recording layer, wherein the tolerance length is set to substantially 40 μm in a radial direction of the recording medium.

2. The recording apparatus according to claim 1, wherein the record information is recorded into the ODTA through the first recording layer in which the record information is unrecorded.

3. The recording apparatus according to claim 1, wherein said controlling device controls said recording device to record the pre-information before the finalizing, into an area portion which is one portion of the middle area and whose addresses range from the address "A" to an address "B2", wherein the address "B2" is an address of the position obtained by shifting toward the inner circumferential side of the middle area by a sum of the tolerance length and a clearance length from the edge on the most outer circumferential side of the middle area, wherein the clearance length indicates a sum of (i) a spot radius of the laser light on the first recording layer in the case that the laser light is focused on the second recording layer and (ii) a relative eccentric shift of the first and second recording layers or an acceptable range of the eccentric shift, wherein the clearance length is set to substantially 84 μm.

4. The recording apparatus according to claim 1, wherein said recording apparatus further comprises a converting device for converting the tolerance length to a recording unit of the record information, and said controlling device controls said recording device to record the pre-information before the finalizing, into an area portion which is one portion of the middle area and whose addresses range from the address "A" to the address "B1", wherein the address "B1" is the address of the position obtained by shifting toward the inner circumferential side of the middle area by the tolerance length, which is converted to the recording unit, from the edge on the most outer circumferential side of the middle area.

5. The recording apparatus according to claim 1, wherein if the record information is recorded in the ODTA, said controlling device controls said recording device to record the pre-information before the finalizing, into an area portion which is one portion of the middle area and whose addresses range from the address "A" to an address "B3", wherein the address "B3" is an address of the position obtained by shifting toward the inner circumferential side of the middle area by the tolerance length from a position of the first recording layer corresponding to an edge on the outer circumferential side of an area portion in the ODTA in which the record information is unrecorded.

6. The recording apparatus according to claim 1, wherein the record information is recorded into the first recording layer in one direction, and the record information is recorded into the second recording layer in another direction different from the one direction.

7. The recording apparatus according to claim 1, further comprising an obtaining device for obtaining an address value next to a most outer circumferential address of a recording area out of the middle area in which the pre-information is recorded, as an address where the pre-recording is started, if the pre-information is recorded before the finalizing into the middle area.

8. The recording apparatus according to claim 7, wherein said controlling device controls said recording device to record the most outer circumferential address into the recording medium.

9. A recording apparatus, comprising:

a recording device for recording record information by irradiating laser light onto a recording medium comprising: (i) a first recording layer which is irradiated with the laser light to thereby record therein the record information and which has a middle area in which the record information is recorded; and (ii) a second recording layer which is irradiated with the laser light through the first recording layer to thereby record therein the record information and which has an ODTA (Outer Disc Testing Area) in which the recorded information is recorded by irradiating the ODTA with the laser light through an area portion of the first recording layer in which the record information is unrecorded; and a controlling device for controlling said recording device to record pre-information of the record information before a finalizing, into an area portion which is one portion of the middle area and whose addresses range from an address "A" to an address "B3", wherein the address "A" is the most inner circumferential address of the middle area, the address "B3" is an address of the position obtained by shifting toward the inner circumferential side of the middle area by a tolerance length from a position of the first recording layer corresponding to an edge on the outer circumferential side of an area portion in the ODTA in which the record information is unrecorded, and the tolerance length indicates an acceptable range of a relative position shift between an address which is defined on the predetermined position in the first recording layer and an address which is related to the predetermined position in the second recording layer, wherein the tolerance length is set to substantially 40 μm in a radial direction of the recording medium.

10. A recording method in a recording apparatus comprising: a recording device for recording record information by irradiating laser light onto a recording medium comprising: (i) a first recording layer which is irradiated with the laser light to thereby record therein the record information and which has a middle area in which the record information is recorded; and (ii) a second recording layer which is irradiated with the laser light through the first recording layer to thereby record therein the record information and which has an ODTA (Outer Disc Testing Area) whose edge on an inner circumferential side corresponds to an edge on an outer circumferential side of the middle area, said recording method comprising:

a first controlling process of controlling said recording device to record the record information; and a second controlling process of controlling said recording device to record pre-information of the record information before a finalizing, into an area portion which is one portion of the middle area and whose addresses range from an address "A" to an address "B1", wherein the address "A" is the most inner circumferential address of the middle area, the address "B1" is an address of the position obtained by shifting toward the inner circumferential side of the middle area by a tolerance length from the edge on the most outer circumferential side of the middle area, and the tolerance length indicates an acceptable range of a relative position shift between an address which is defined on the predetermined position in the first recording layer and an address which is related to the predetermined position in the second recording layer, wherein the tolerance length is set to substantially 40 μm in a radial direction of the recording medium.

11. A recording method in a recording apparatus comprising: a recording device for recording record information by irradiating laser light onto a recording medium comprising: (i) a first recording layer which is irradiated with the laser light to thereby record therein the record information and which has a middle area in which the record information is recorded; and (ii) a second recording layer which is irradiated with the laser light through the first recording layer to thereby record therein the record information and which has an ODTA (Outer Disc Testing Area) in which the recorded information is recorded by irradiating the ODTA with the laser light through an area portion of the first recording layer in which the record information is unrecorded, said recording method comprising:
a first controlling process of controlling said recording device to record the record information; and
a second controlling process of controlling said recording device to record pre-information of the record information before a finalizing, into an area portion which is one portion of the middle area and whose addresses range from an address "A" to an address "B3", wherein the address "A" is the most inner circumferential address of the middle area, the address "B3" is an address of the position obtained by shifting toward the inner circumferential side of the middle area by a tolerance length from a position of the first recording layer corresponding to an edge on the outer circumferential side of an area portion in the ODTA in which the record information is unrecorded, and the tolerance length indicates an acceptable range of a relative position shift between an address which is defined on the predetermined position in the first recording layer and an address which is related to the predetermined position in the second recording layer, wherein the tolerance length is set to substantially 40 μm in a radial direction of the recording medium.

* * * * *